United States Patent
Murch et al.

(10) Patent No.: US 10,286,617 B2
(45) Date of Patent: May 14, 2019

(54) MACHINE FOR INFLATING AND SEALING AN INFLATABLE WEB

(71) Applicant: Sealed Air Corporation (US), Duncan, SC (US)

(72) Inventors: Brian A. Murch, Needham, MA (US); Jason D. Lepine, Dedham, MA (US); Laurence B. Sperry, Newton, MA (US)

(73) Assignee: Sealed Air Corporation (US), Charlotte, NC (US)

( * ) Notice: Subject to any disclaimer, the term of this patent is extended or adjusted under 35 U.S.C. 154(b) by 1266 days.

(21) Appl. No.: 14/029,956

(22) Filed: Sep. 18, 2013

(65) Prior Publication Data
US 2015/0075114 A1    Mar. 19, 2015

(51) Int. Cl.
*B29D 22/02*   (2006.01)
*B29C 65/22*   (2006.01)
*B31D 5/00*    (2017.01)

(52) U.S. Cl.
CPC .............. *B29D 22/02* (2013.01); *B29C 65/22* (2013.01); *B31D 5/0073* (2013.01); *B31D 2205/0023* (2013.01); *B31D 2205/0088* (2013.01); *B65H 2801/81* (2013.01)

(58) Field of Classification Search
CPC ................................ B29D 22/02; B65H 23/02
USPC ............................................................ 53/79
See application file for complete search history.

(56) References Cited

U.S. PATENT DOCUMENTS

| | | |
|---|---|---|
| 3,546,433 A | 12/1970 | Ewing |
| 3,596,428 A | 8/1971 | Young et al. |
| 3,660,189 A | 5/1972 | Troy |
| 3,703,430 A | 11/1972 | Rich |
| 3,735,551 A | 5/1973 | Pratt |
| 3,817,803 A | 6/1974 | Horsky |
| 3,868,285 A | 2/1975 | Troy |

(Continued)

FOREIGN PATENT DOCUMENTS

| | | |
|---|---|---|
| EP | 1616693 A2 | 1/2006 |
| WO | 0064672 A1 | 11/2000 |

OTHER PUBLICATIONS

Sealed Air Corporation, assignee of the subject application, currently makes and sells NewAir I.B.® Express inflatable cushioning systems, as described in U.S. Pub. No. 2010/0251668 A1, wherein such machines further include a web tracking sensor, an engagement member for engaging a roll of an inflatable web on a spool, and an actuator to move the engagement member based on information supplied by the web tracking sensor. The engagement member and actuator are rigidly coupled to one another, such that the force of loading a roll onto the spool is directly transmitted to "NPL" considered: Sperry, Machine For Inflating and Sealing an Inflatabie Structure, Pub. No. US 2010/0251668, Oct. 7, 2010, pp. 1-6, United States of America

*Primary Examiner* — Thanh K Truong
*Assistant Examiner* — Dariush Seif
(74) *Attorney, Agent, or Firm* — Jon M. Isaaacson

(57) ABSTRACT

A machine for inflating and sealing an inflatable web, the web including opposing longitudinal edges and a pair of sheets sealed together by transverse seals that form a series of inflatable containers. The machine generally includes a support structure, a spool for supporting a roll of the inflatable web, a web conveyance system, an inflation system to inflate the containers, and a sealing device for sealing closed the openings of the containers.

14 Claims, 20 Drawing Sheets

(56) References Cited

U.S. PATENT DOCUMENTS

| | | | |
|---|---|---|---|
| 3,908,881 A * | 9/1975 | McCann | B65H 23/0208 |
| | | | 226/19 |
| 4,017,351 A | 4/1977 | Larson et al. | |
| 4,096,306 A | 6/1978 | Larson | |
| 4,141,517 A | 2/1979 | Olcer | |
| 4,149,682 A * | 4/1979 | Gustafson | B66C 1/54 |
| | | | 242/571.3 |
| 4,384,442 A | 5/1983 | Pendleton | |
| 4,847,126 A | 7/1989 | Yamashiro et al. | |
| 5,087,318 A * | 2/1992 | Anderson | B65H 16/04 |
| | | | 156/540 |
| 5,187,917 A | 2/1993 | Mykleby | |
| 5,216,868 A | 6/1993 | Cooper et al. | |
| 5,340,632 A | 8/1994 | Chappuis | |
| 5,351,828 A | 10/1994 | Becker et al. | |
| 5,376,219 A | 12/1994 | Sperry et al. | |
| 5,581,983 A | 12/1996 | Murakami | |
| 5,660,662 A | 8/1997 | Testone | |
| 5,664,738 A * | 9/1997 | Fife | B65H 23/0208 |
| | | | 226/19 |
| 5,679,208 A | 10/1997 | Sperry et al. | |
| 5,824,392 A | 10/1998 | Gotoh et al. | |
| 5,937,614 A | 8/1999 | Watkins et al. | |
| 5,938,098 A * | 8/1999 | Fife | B65H 23/0212 |
| | | | 137/595 |
| 5,942,076 A | 8/1999 | Salerno et al. | |
| RE36,501 E | 1/2000 | Hoover et al. | |
| 6,195,966 B1 | 3/2001 | Shomron et al. | |
| 6,209,286 B1 | 4/2001 | Perkins et al. | |
| 6,410,119 B1 | 6/2002 | De Luca et al. | |
| 6,460,313 B1 | 10/2002 | Cooper | |
| 6,565,946 B2 | 5/2003 | Perkins et al. | |
| 6,575,757 B1 | 6/2003 | Leight et al. | |
| 6,582,800 B2 | 6/2003 | Fuss et al. | |
| 6,605,169 B2 | 8/2003 | Perkins et al. | |
| 6,635,145 B2 | 10/2003 | Cooper | |
| 6,651,406 B2 | 11/2003 | Sperry et al. | |
| 6,659,150 B1 | 12/2003 | Perkins et al. | |
| 7,225,599 B2 | 6/2007 | Sperry et al. | |
| 7,429,304 B2 * | 9/2008 | McNamara, Jr. | B31D 5/0073 |
| | | | 156/145 |
| 7,950,433 B2 | 5/2011 | Sperry et al. | |
| 8,402,719 B2 * | 3/2013 | Birkle | B31D 5/0073 |
| | | | 493/967 |
| 2007/0251190 A1 | 11/2007 | Daigle et al. | |
| 2008/0250753 A1 | 10/2008 | Sperry et al. | |
| 2009/0308965 A1 * | 12/2009 | Piucci | B26D 5/20 |
| | | | 242/526 |
| 2010/0200169 A1 * | 8/2010 | Sperry | B31D 5/0073 |
| | | | 156/495 |
| 2010/0251668 A1 | 10/2010 | Sperry et al. | |
| 2012/0072016 A1 | 3/2012 | Sperry et al. | |

* cited by examiner

MACHINE FOR INFLATING AND SEALING AN INFLATABLE WEB

BACKGROUND OF THE INVENTION

The present invention relates to inflated containers, e.g., inflated packaging cushions, and, more particularly, to a simplified and improved machine for producing the same.

Various machines for forming inflated cushions, pillows, or other inflated containers are known. For packaging applications, inflated cushions are used to package items, by wrapping the items in the cushions and placing the wrapped items in a shipping carton, or simply placing one or more inflated cushions inside of a shipping carton along with an item to be shipped. The cushions protect the packaged item by absorbing impacts that may otherwise be fully transmitted to the packaged item during transit, and also restrict movement of the packaged item within the carton to further reduce the likelihood of damage to the item.

Earlier machines for forming inflated cushions tended to be rather large, expensive, and complex. More recently, smaller, less-expensive inflation machines have been developed, which employ inflatable webs having pre-formed containers. Many such machines, however, suffer from alignment and tracking problems of the inflatable web as it moves through the machine, resulting in poorly-inflated, non-inflated, and/or poorly-sealed cushions, which lead to web wastage and/or cushions that deflate prematurely or otherwise fail to protect the packaged product. Also, such machines have less-than-optimal web-loading, web-feeding, and web-sealing mechanisms. With respect to the latter, web movement and wrinkling often cause poor or incomplete heat-seals to be formed, which typically results in deflation of the cushions. In addition, portions of the inflated web often become trapped in the sealing mechanism, which causes the web to wrap around and clog the sealing mechanism, necessitating a shut-down of the machine so that the clog can be removed, resulting in a waste of both time and material. Finally, in many cases, the operation of the machines are routinely paused, e.g., stopped by the operator and then re-started. Unfortunately, this action has been found to frequently result in inconsistent inflation (over-inflation, under-inflation, or non-inflation) of at least one cushion, which can lead to product damage during shipment and/or storage due to ineffective product protection in the subsequently-formed package.

Accordingly, there remains a need in the art for simple and reliable machines for producing gas-filled containers that are suitable for use as packaging cushions, which address and overcome one or more of the foregoing operational issues.

SUMMARY OF THE INVENTION

That need is met by the present invention, which, in one aspect, pertains to a machine for inflating and sealing an inflatable web comprising opposing longitudinal edges and a pair of sheets sealed together by transverse seals that form a series of inflatable containers between pairs of the transverse seals, each of the containers being capable of holding therein a quantity of gas and having an opening for receiving such gas, the machine comprising:

a. a support structure;

b. a spool attached to said support structure for rotatively supporting a roll of the inflatable web, said spool having a proximal end at which said spool is attached to said support structure;

c. a positioning mechanism structured and arranged to establish a position of the roll on said spool, said positioning mechanism comprising 1) an engagement member interposed between the roll and said support structure at said proximal end of said spool, said engagement member adapted to engage the roll and move relative to said spool, and 2) an actuator structured and arranged to move said engagement member to thereby establish said position of the roll on said spool, wherein said actuator and said engagement member are configured to separate from one another when a force exerted on said engagement member exceeds a predetermined amount;

d. a web conveyance system for conveying the inflatable web along a path of travel substantially parallel to the longitudinal edges of the inflatable web;

e. an inflation system structured and arranged to direct gas into the openings of the containers as the web is advanced along the path, thereby inflating the containers;

f. a web tracking sensor adapted to detect a transverse position of the inflatable web with respect to said inflation system;

g. a sealing device for sealing closed the openings of the containers after inflation thereof by the inflation system; and h. a controller in operative communication with said web tracking sensor and with said positioning mechanism, said controller adapted to receive input from said tracking sensor and, based on said input, send output to said positioning mechanism to adjust said position of the roll on said spool so as to maintain said transverse position of the inflatable web within a predetermined range.

In accordance with another aspect of the present invention, a machine is provided for inflating and sealing an inflatable web as described above, the machine comprising:

a. a support structure;

b. a spool attached to said support structure for rotatively supporting a roll of the inflatable web, c. a web conveyance system for conveying the inflatable web along a path of travel substantially parallel to the longitudinal edges of the inflatable web;

d. an inflation system structured and arranged to direct gas into the openings of the containers as the web is advanced along the path, thereby inflating the containers; and e. a sealing device for sealing closed the openings of the containers after inflation thereof by the inflation system, wherein (1) said sealing device includes a seal zone and an isolation zone;

(2) said isolation zone is upstream from said seal zone along said path of travel, and (3) said isolation zone is structured and arranged to substantially isolate said seal zone from irregularities in the web as it is conveyed along said path.

A further aspect of the present invention is directed to a machine for inflating and sealing an inflatable web as described above, the machine comprising:

a. a support structure;

b. a spool attached to said support structure for rotatively supporting a roll of the inflatable web, c. a web conveyance system for conveying the inflatable web along a path of travel substantially parallel to the longitudinal edges of the inflatable web;

d. an inflation system structured and arranged to direct gas into the openings of the containers as the web is advanced along the path, thereby inflating the containers; and e. a sealing device for sealing closed the openings of the containers after inflation thereof by the inflation system, wherein (1) said sealing device includes a seal zone and one or more web guides, and (2) said web guides are structured and arranged to direct at least a portion of the web away from said seal zone as the web is conveyed along said path.

An additional aspect of the invention is directed towards a machine for inflating and sealing an inflatable web comprising opposing longitudinal edges and a pair of sheets sealed together by transverse seals that form a series of inflatable containers between pairs of the transverse seals, each of the containers being capable of holding therein a quantity of gas and having an opening for receiving such gas, the machine comprising:

a. a support structure;

b. a spool attached to said support structure for rotatively supporting a roll of the inflatable web, the roll including a core having an inner diameter, said spool including a contact surface and being structured and arranged such that said contact surface exerts an outwardly-biased force against the inner diameter of the core;

c. a web conveyance system for conveying the inflatable web along a path of travel substantially parallel to the longitudinal edges of the inflatable web;

d. an inflation system structured and arranged to direct gas into the openings of the containers as the web is advanced along the path, thereby inflating the containers; and e. a sealing device for sealing closed the openings of the containers after inflation thereof by the inflation system.

Yet another aspect of the invention is directed towards a machine for inflating and sealing an inflatable web comprising opposing longitudinal edges and a pair of sheets sealed together by transverse seals that form a series of inflatable containers between pairs of the transverse seals, each of the containers being capable of holding therein a quantity of gas and having an opening for receiving such gas, the machine comprising:

a. a support structure;

b. a spool attached to said support structure for rotatively supporting a roll of the inflatable web;

c. a web conveyance system for conveying the inflatable web along a path of travel substantially parallel to the longitudinal edges of the inflatable web;

d. an inflation system structured and arranged to direct gas into the openings of the containers as the web is advanced along the path, thereby inflating the containers;

e. a sealing device for sealing closed the openings of the containers after inflation thereof by the inflation system;

f. a web tracking sensor structured and arranged to detect the transverse seals; and g. a controller in operative communication with said web tracking sensor and with said web conveyance system, said controller adapted to receive input from said tracking sensor and to receive a stop command, whereby, upon receipt of said stop command, said controller sends output to said conveyance system to stop conveying the inflatable web such that the web stops at a predetermined location relative to a pair of the transverse seals from adjacent containers.

In the foregoing machine, the predetermined web location may comprise said pair of transverse seals in a straddling position relative to said sealing device such that a) a downstream container associated with a downstream one of said pair of transverse seals is inflated and sealed closed; and b) an upstream container associated with an upstream one of said pair of transverse seals is in position to be inflated and sealed closed upon receipt of a restart command by said controller.

An additional aspect of the present invention is directed towards a machine for inflating and sealing an inflatable web comprising opposing longitudinal edges and a pair of sheets sealed together by transverse seals that form a series of inflatable containers between pairs of the transverse seals, each of the containers being capable of holding therein a quantity of gas and having an opening for receiving such gas, the machine comprising:

a. a support structure;

b. a spool attached to said support structure for rotatively supporting a roll of the inflatable web, c. a web conveyance system for conveying the inflatable web along a path of travel substantially parallel to the longitudinal edges of the inflatable web, said conveyance system comprising a pair of rotary members, wherein at least one of said rotary members is mounted on a pivot mechanism with an upstream actuator and a downstream pivot point, said pivot mechanism being movable between (1) a conveyance position, at which said rotary members are in contact with one another at a point of convergence, and (2) a web-threading position, at which said rotary members are not in contact with one another;

d. an inflation system structured and arranged to direct gas into the openings of the containers as the web is advanced along the path, thereby inflating the containers; and e. a sealing device for sealing closed the openings of the containers after inflation thereof by the inflation system.

These and other aspects and features of the invention may be better understood with reference to the following description and accompanying drawings.

DETAILED DESCRIPTION OF THE INVENTION

Figure 1:
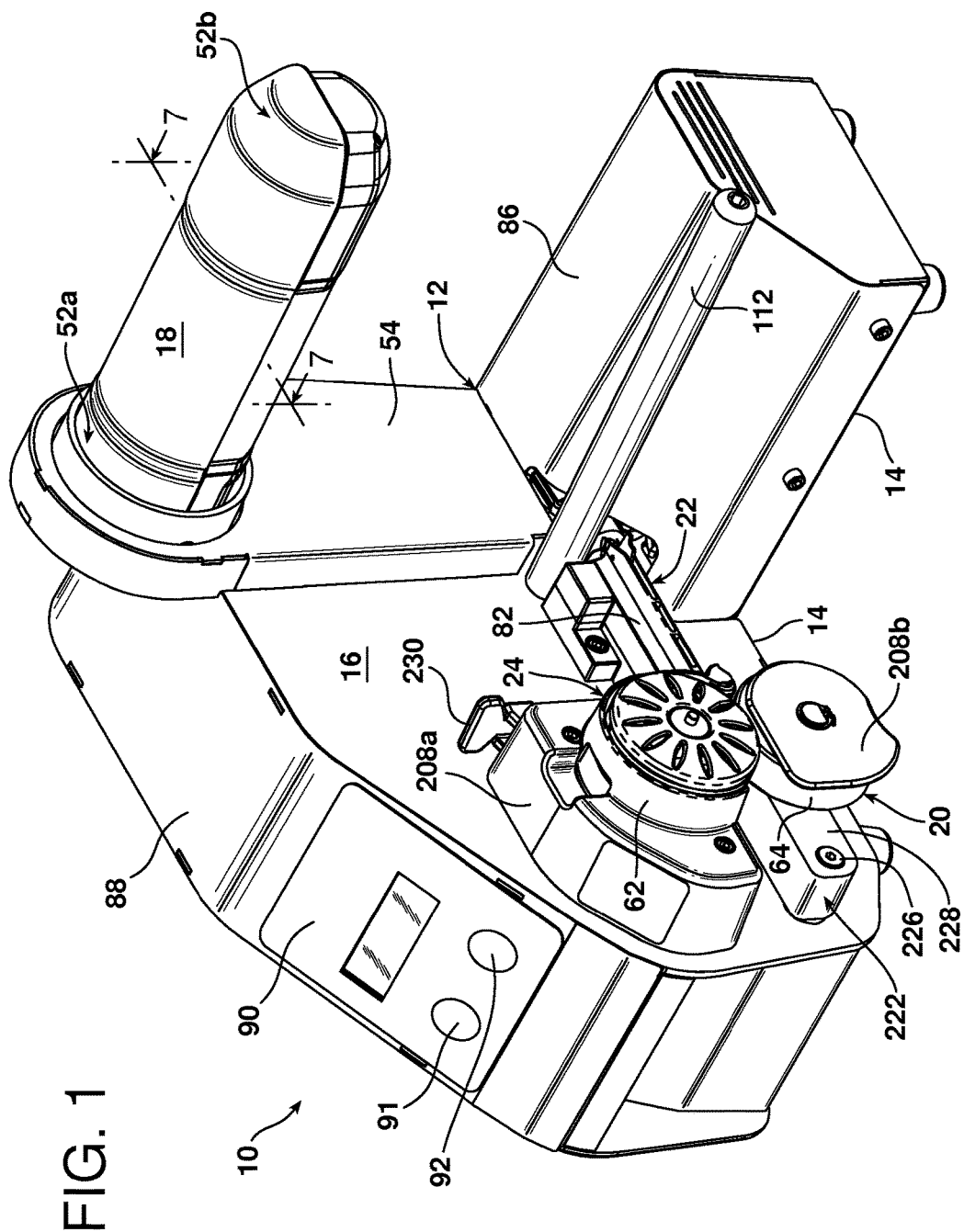
FIG. 1 is a perspective view of a machine, in accordance with the present invention, for inflating and sealing an inflatable web having a series of containers.

FIGS. 1-5 illustrate a machine 10 for inflating and sealing an inflatable web in accordance with the present invention. Machine 10 includes a support structure 12, which may comprise a base 14 and a wall 16 extending upwards from the base. Machine 10 further includes a spool 18 for rotatively supporting a roll of the inflatable web, a web conveyance system 20 for conveying the inflatable web along a path of travel, an inflation system 22 for inflating the containers, and a sealing device 24 located proximate to the inflation system for sealing closed the inflated containers.

Figure 2:
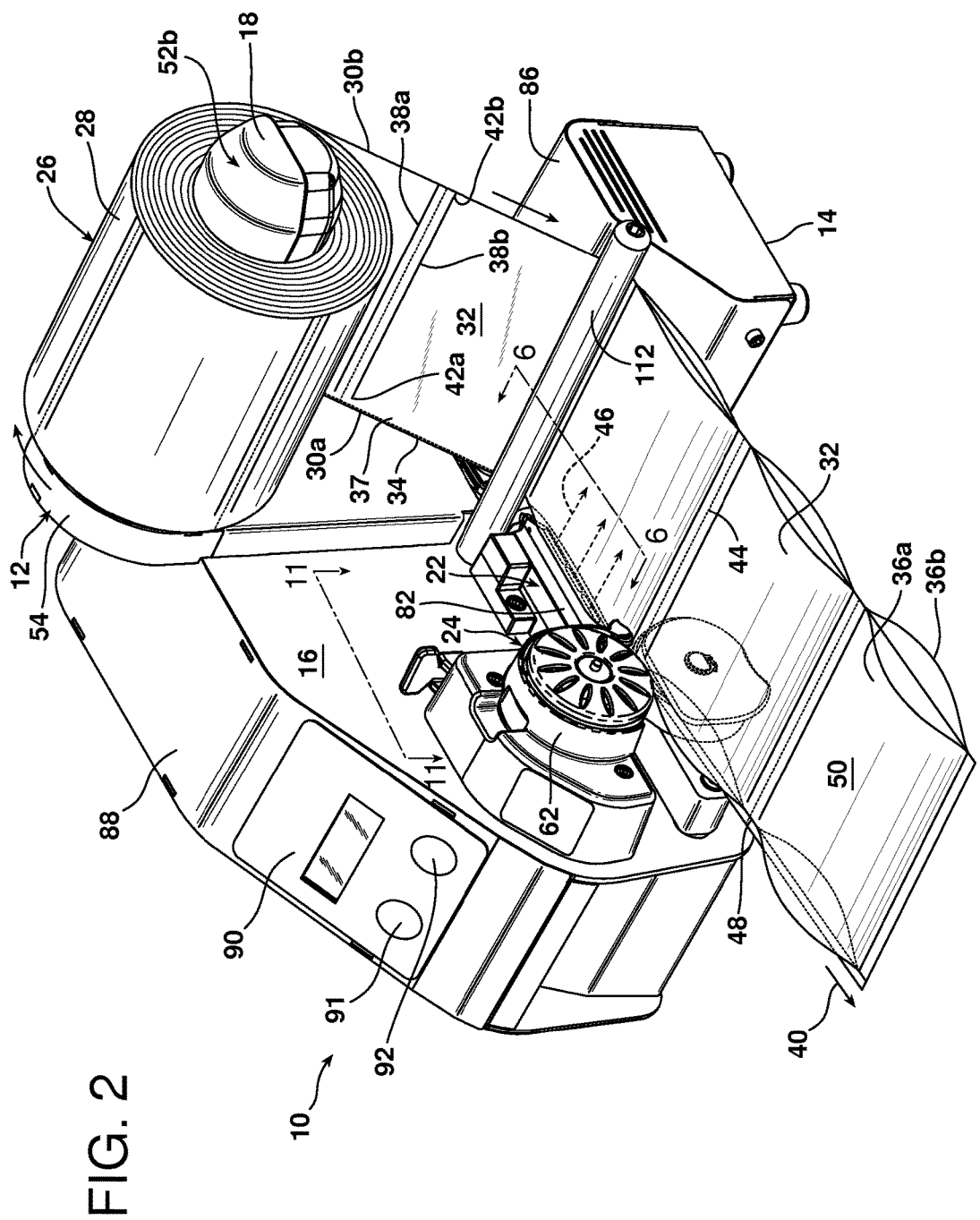
FIG. 2 is similar to FIG. 1, except that it illustrates the machine being used with a roll of an inflatable web to inflate and seal the containers included in the web.

FIG. 2 illustrates machine 10 being used to inflate and seal an inflatable web 26. Web 26 is in the form of a roll 28, which is rotatively supported by spool 18. Web 26 has opposing first and second longitudinal edges 30a, b, and includes a series of inflatable containers 32. Each of the containers 32 is capable of holding therein a quantity of gas, e.g., air, and each has an opening 34 at the first edge 30a for receiving such gas.

Web 26 may further comprise a pair of juxtaposed sheets 36a, b, e.g., film sheets. In the illustrated embodiment, first longitudinal edge 30a of the web 26 is open, i.e., unsealed, while second longitudinal edge 30b is closed, e.g., sealed or folded. The web conveyance system 20 conveys the inflatable web 26 along a path of travel 40, which is substantially parallel to the longitudinal edges 30a, b of the inflatable web.

The containers 32 may be defined between sheets 36a, b and between a series of transverse seals 38. The seals 38 are described as 'transverse' because they are aligned in a direction that is generally transverse to the longitudinal edges 30a, b of web 26 and path of travel 40. As shown in FIG. 2, the seals 38 may be arranged as relatively closely-spaced pairs 38a, b, such that each container 32 is defined in web 26 between a leading transverse seal 38a from a downstream pair of seals 38, and a following transverse seal 38b from an adjacent, upstream pair of such seals. Stated differently, i.e., from the perspective of the closely-spaced seal-pairs, the upstream transverse seal of each seal-pair is designated 38a while the downstream seal is designated 38b.

The openings 34 of the containers 32 are formed by the open first edge 30a of the web 26 and the first ends 42a of the transverse seals 38. The opposing second ends 42b terminate at the closed second edge 30b. The first ends 42a of the transverse seals are spaced from first edge 30a, in order to form a pair of opposing open (unattached) flanges in sheets 36a, b that form an 'open skirt' region 37, which allows inflation system 22, e.g., nozzle 82 thereof, to be accommodated within web 26, i.e., between film sheets 36a, b, in order to facilitate inflation, as disclosed, e.g., in U.S. Pat. No. 6,651,406, the disclosure of which is hereby incorporated herein by reference thereto (see, also, FIG. 6). In order to allow individual or groups of inflated containers to be separated from the web 26, a line of weakness 44, e.g., a perforated line, may be included between each container 32, i.e., between each upstream/downstream pair of transverse seals 38a, b as shown.

Web 26 may, in general, comprise any flexible film material that can be manipulated by machine 10 to enclose a gas as herein described, including various thermoplastic materials, e.g., polyethylene homopolymer or copolymer, polypropylene homopolymer or copolymer, etc. Non-limiting examples of suitable thermoplastic polymers include polyethylene homopolymers, such as low density polyethylene (LDPE) and high density polyethylene (HDPE), and polyethylene copolymers such as, e.g., ionomers, EVA, EMA, heterogeneous (Zeigler-Natta catalyzed) ethylene/alpha-olefin copolymers, and homogeneous (metallocene, single-cite catalyzed) ethylene/alpha-olefin copolymers. Ethylene/alpha-olefin copolymers are copolymers of ethylene with one or more comonomers selected from $C_3$ to $C_{20}$ alpha-olefins, including linear low density polyethylene (LLDPE), linear medium density polyethylene (LMDPE), very low density polyethylene (VLDPE), and ultra-low density polyethylene (ULDPE). Various other polymeric materials may also be used such as, e.g., polypropylene homopolymer or polypropylene copolymer (e.g., propylene/ethylene copolymer), polyesters, polystyrenes, polyamides, polycarbonates, etc. The film may be monolayer or multi-layer and can be made by any known extrusion process by melting the component polymer(s) and extruding, coextruding, or extrusion-coating them through one or more flat or annular dies.

As shown in FIG. 2, web conveyance system 20 advances web 26 along path of travel 40 beside wall 16, with the web being oriented such that the first edge 30a thereof is adjacent to the wall. Inflation system 22 is positioned to direct gas, as indicated by arrows 46, into the openings 34 of the containers 32 as the web 26 is advanced along the path 40, thereby inflating the containers.

Figure 11:
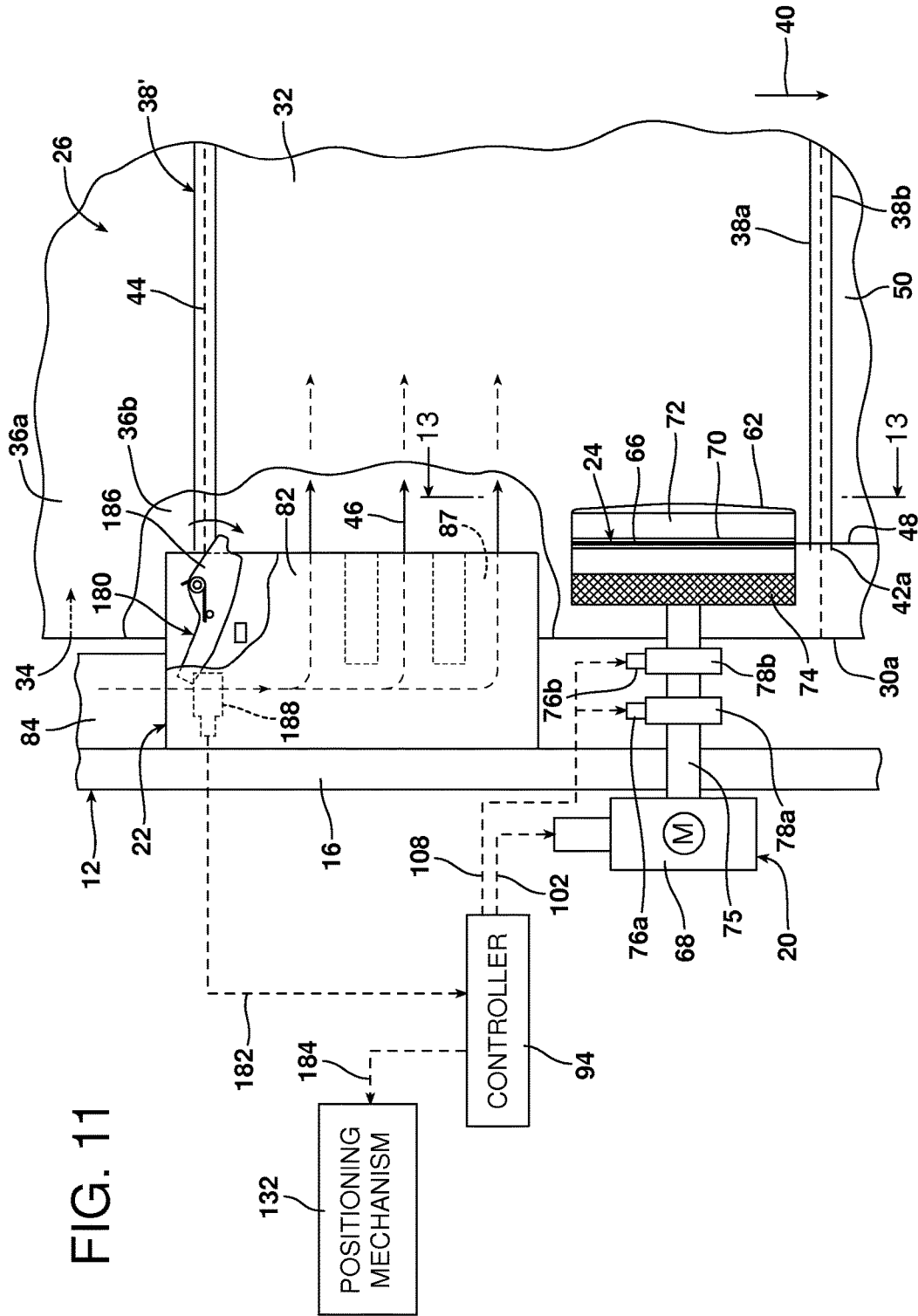
FIG. 11 is a partial plan view of the machine, taken along lines 11-11 in FIG. 2 and with the web guide removed from the sealing roller.

As also shown in FIG. 2, sealing device 24 may be positioned just downstream of the inflation system 22 so that it substantially contemporaneously seals closed the openings 34 of the containers 32 as they are being inflated (see, also, FIG. 11). Sealing device 24 may seal closed openings 34 by producing a longitudinal seal 48 between film sheets 36a, b, which also intersects transverse seals 38a, b near the first ends 42a thereof to enclose gas 46 within the containers 32. In this manner, the inflatable containers 32 of web 26 are converted into inflated containers 50.

Figure 3:
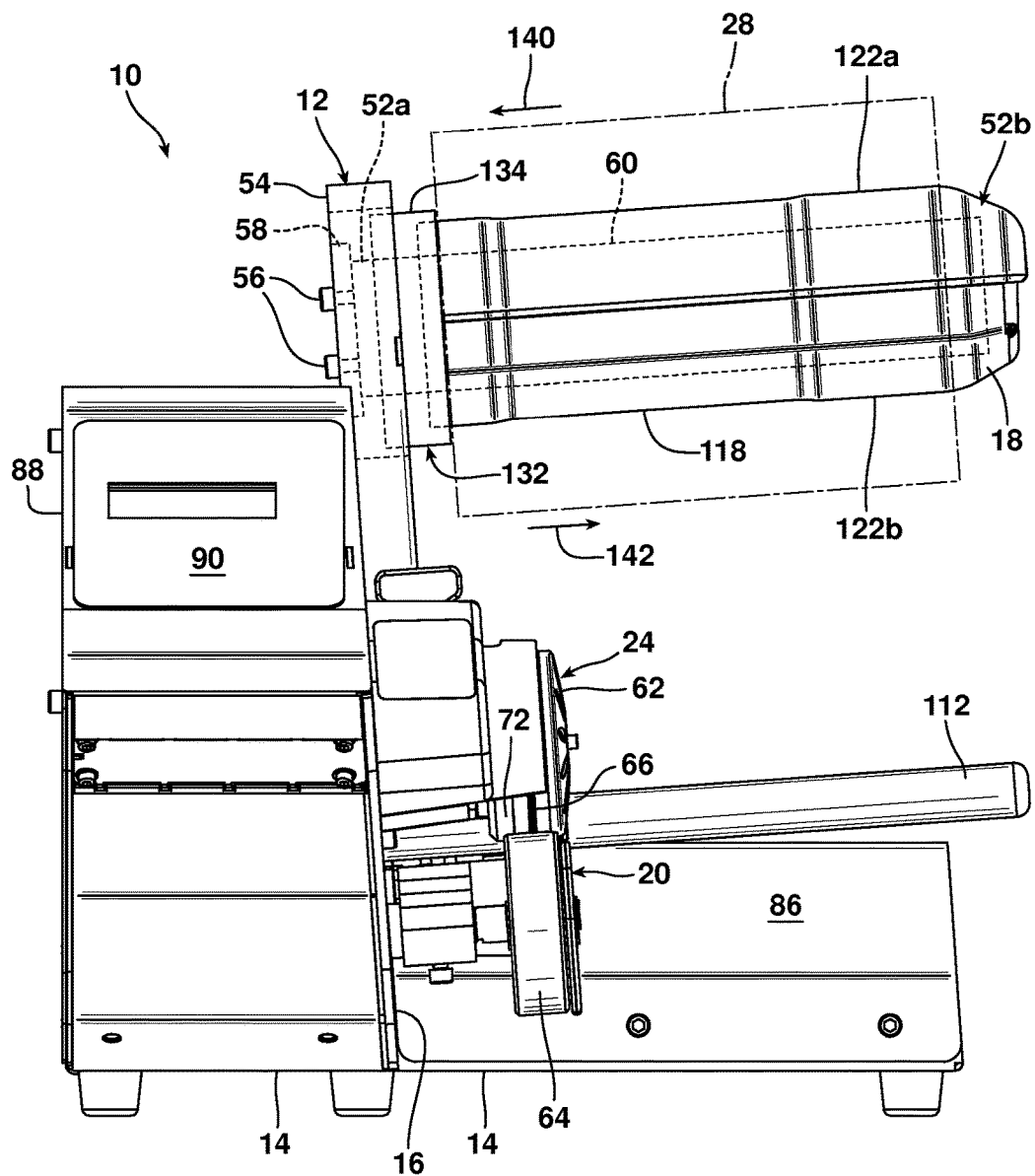
FIG. 3 is a front elevational view of the machine shown in FIG. 1.

Referring to FIGS. 1 and 3, it may be seen that spool 18 has a proximal end 52a, at which the spool is attached to support structure 12, and may also have an opposing distal end 52b, which is spaced from the support structure. In the illustrated embodiment, e.g., as perhaps best shown in FIG. 3, the distal end 52b may have a higher elevation relative to the proximal end 52a, i.e., the spool 18 may have an upward angle (relative to a horizontal plane, e.g., to base 14) as the spool extends away from the wall 16. In this manner, when a web roll 28 is mounted thereon (shown in phantom in FIG. 3), the roll is gravitationally biased towards the support structure 12. Such upward angle of spool 18 may facilitate the manual act of loading a new web roll 28 onto the spool, as the upward angle is often more ergonomic for roll loading, and with gravity assisting in sliding the roll all the way onto the spool 18. The degree of elevation of the distal end 52b of spool 18 may be such that the upward angle of the spool relative to a horizontal plane is between about 1 to about 45 degrees, such as from about 2 to about 30 degrees, about 3 to about 20 degrees, etc. As an example, an upward angle of about 4 degrees above horizontal was found to be suitable.

For those embodiments in which the spool 18 has an upwardly-angled configuration, the resultant gravitational bias of the roll 28 towards the support structure 12 urges the first longitudinal edge 30a of the web 26 towards the web conveyance system 20, inflation system 22, and sealing device 24. The gravitational bias of roll 28 towards support structure 12 has the potential, therefore, to facilitate the reliability of machine 10 by improving the tracking of the open edge of web through the inflation and sealing operations. As will be described in further detail below, however, the inventors hereof found that further means are needed in order to provide proper alignment of the web, i.e., of open longitudinal edge 30a and/or first ends 42a of transverse seals 38, with the conveyance system 20, inflation system 22, and sealing device 24 in such a way that fully-sealed and consistently-inflated containers 50 are formed.

Figure 5:
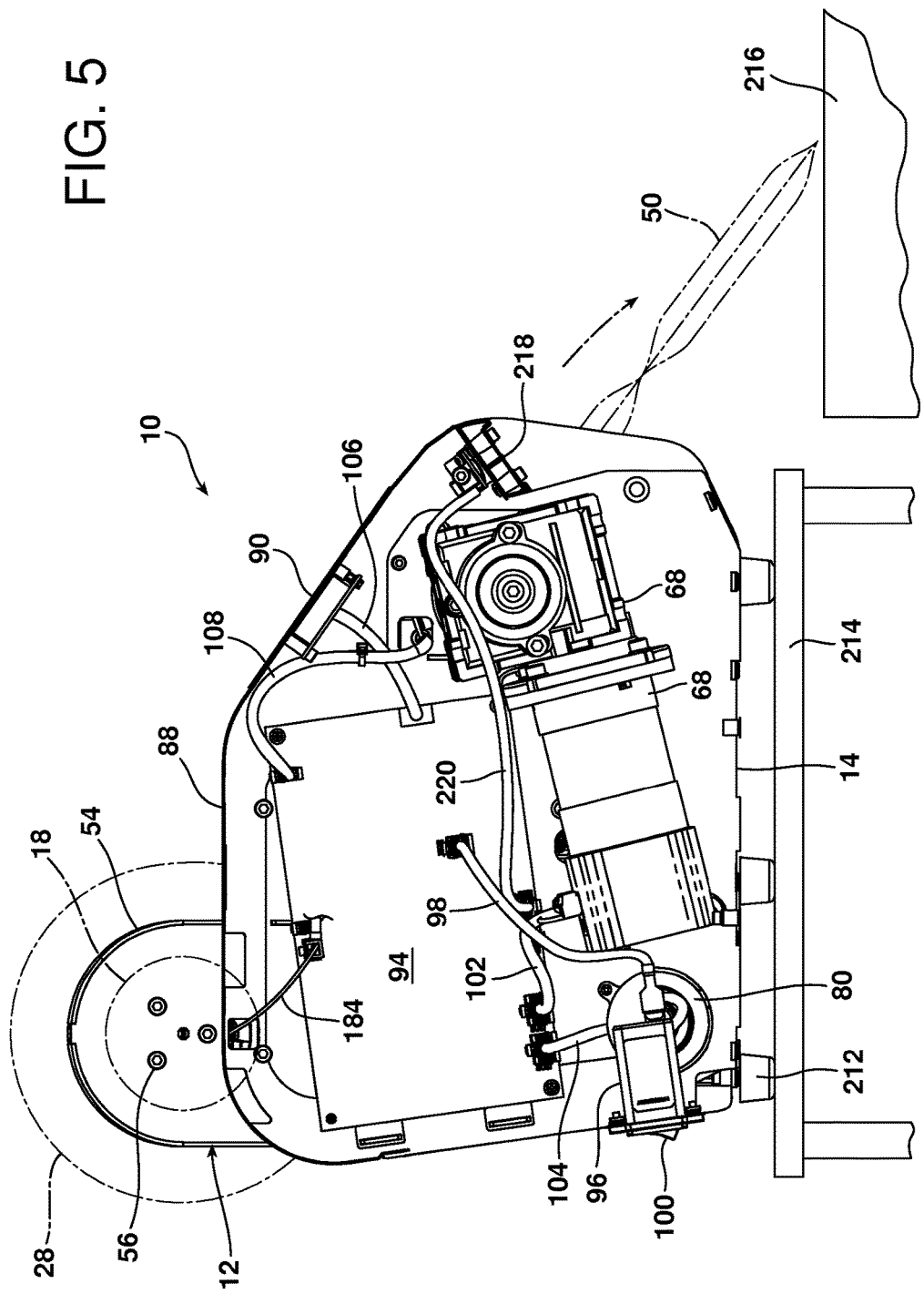
FIG. 5 is an elevational view of the machine, as taken from the opposite side as shown in FIG. 1 and with the backside cover removed to show the components inside of the main housing for the machine.

In order to accommodate the weight and diameter of a full roll 28, support structure 12 may include an upright structural bracket 54, to which spool 18 may be directly attached, e.g., via fasteners (screws) 56 and mounting plate 58 as shown in FIG. 3 (see also FIG. 5, wherein a total of three such fasteners 56 are shown). Mounting plate 58 may thus form the attachment point at which the proximal end 52a of spool 18 is secured to support structure 12. As will be described in further detail below, mounting plate 58 may be an integral part of an internal framework 60 for spool 18, to which the internal components thereof may be mounted. As shown, the upright bracket 54 may be secured to wall 16 of support structure 12, and may serve to elevate spool 18 such that there is sufficient space between the spool and base 14 to accommodate a roll 28 having a desired maximum, full-width diameter.

As illustrated in the drawings, the distal end 52b of the spool 18 is unsupported such that the spool is cantilevered from upright bracket 54 on wall 16. Alternatively, e.g., for large and/or heavy web rolls, the distal end 52b may be supported by a suitable structural component, e.g., an upstanding post with a cradle on which the distal end 52b rests.

The upward angle of spool 18 may be achieved as shown in FIG. 3 by orienting wall 16, and also upright bracket 54, at an angle relative to a vertical plane, with spool 18 being substantially perpendicular to the wall. Alternatively, wall 16 (and also bracket 54) may be oriented in a substantially vertical plane, with spool 18 mounted on the wall (and/or on bracket 54) at an upward angle relative to a horizontal axis passing through the vertical plane. As a further alternative, spool 18 may not have an upward angle, i.e., may have a substantially horizontal configuration.

As noted above, sealing device 24 seals closed openings 34 of containers 32 by producing a longitudinal seal 48 between film sheets 36a, b, which intersects transverse seals 38a, b near the first ends 42a thereof to enclose gas 46 within the containers. In this manner, the inflatable containers 32 of web 26 are converted into inflated containers 50.

Figure 13:
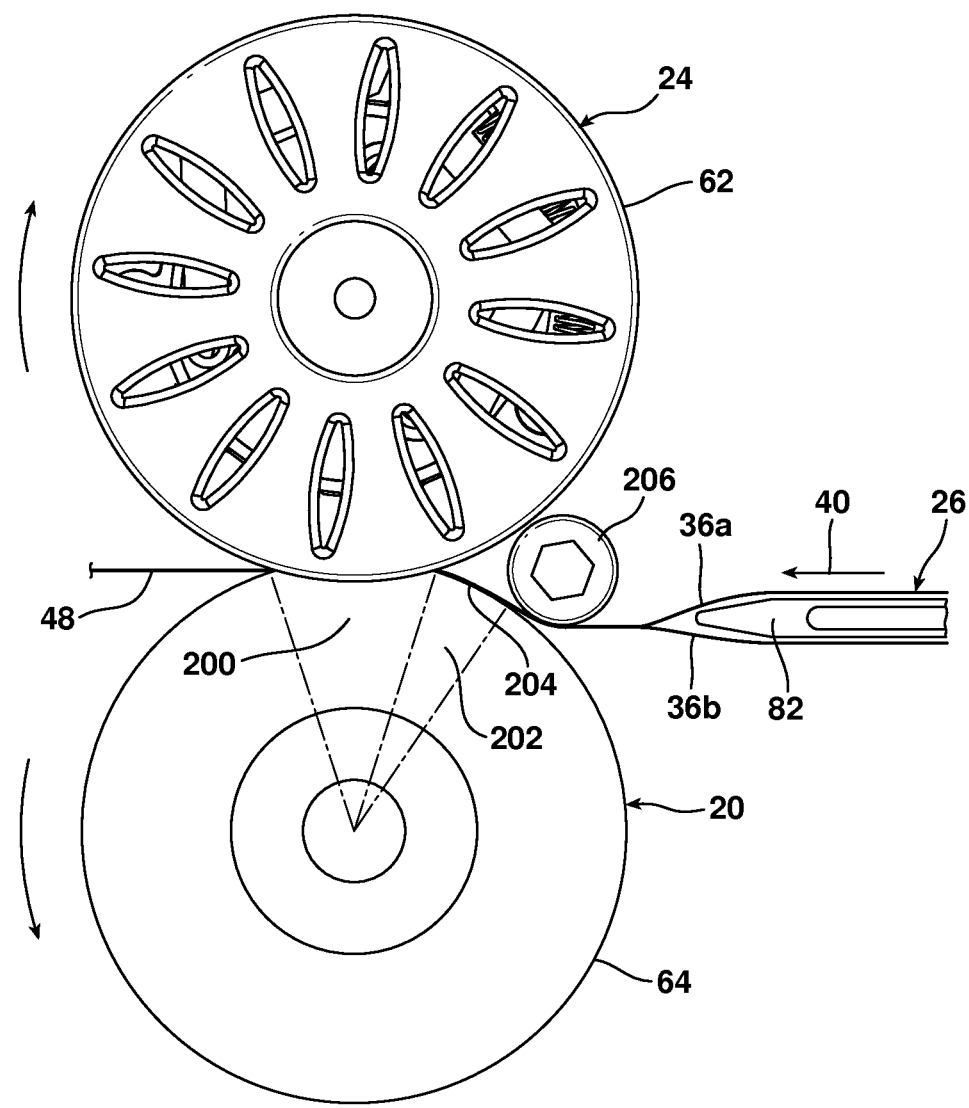
FIG. 13 is a partial elevational view of the machine, taken along lines 13-13 in FIG. 11.
Figure 14:
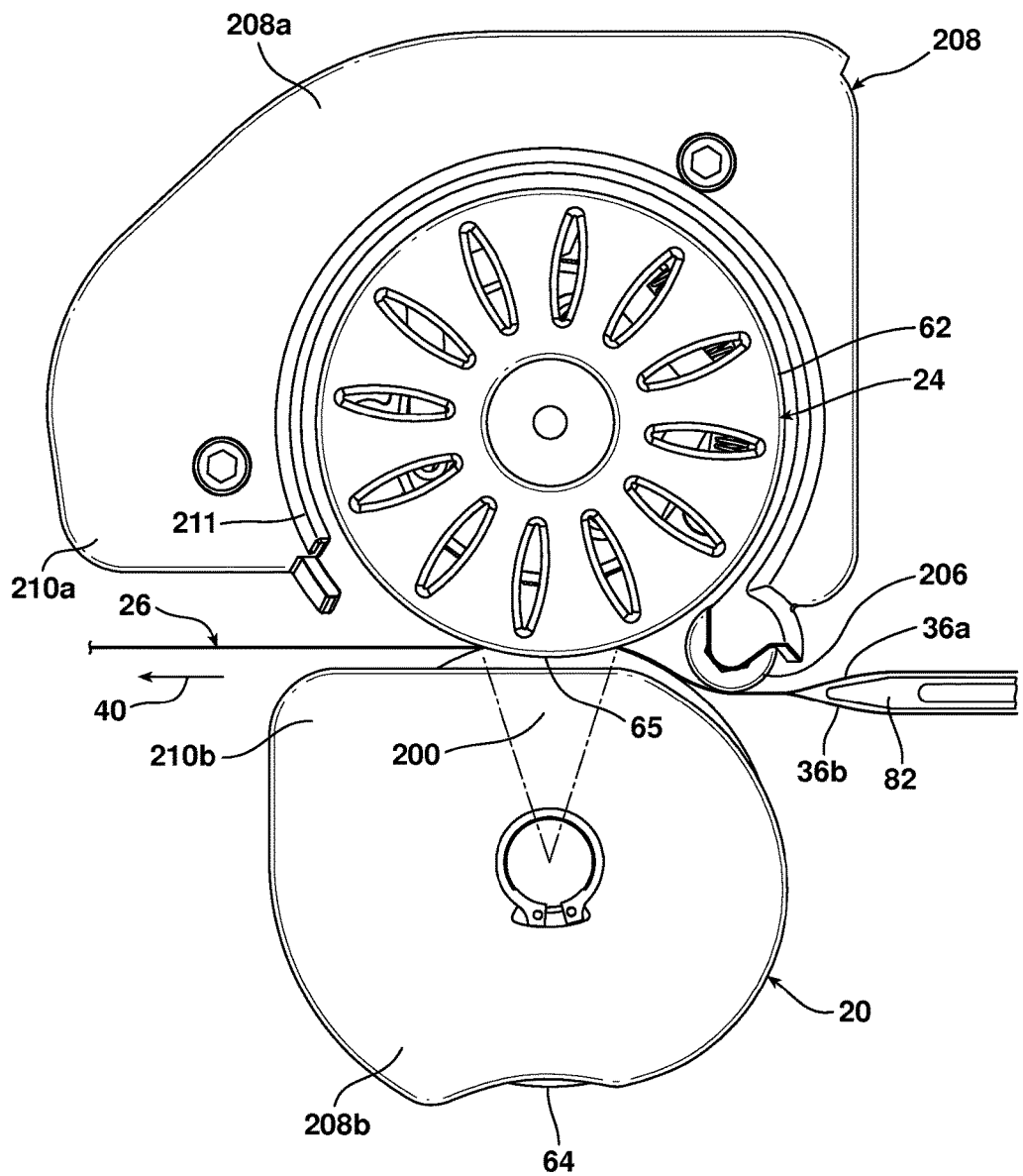
FIG. 14 is an elevational view similar to FIG. 13, with the web guides in place on the sealing and backing rollers.
Figure 15:
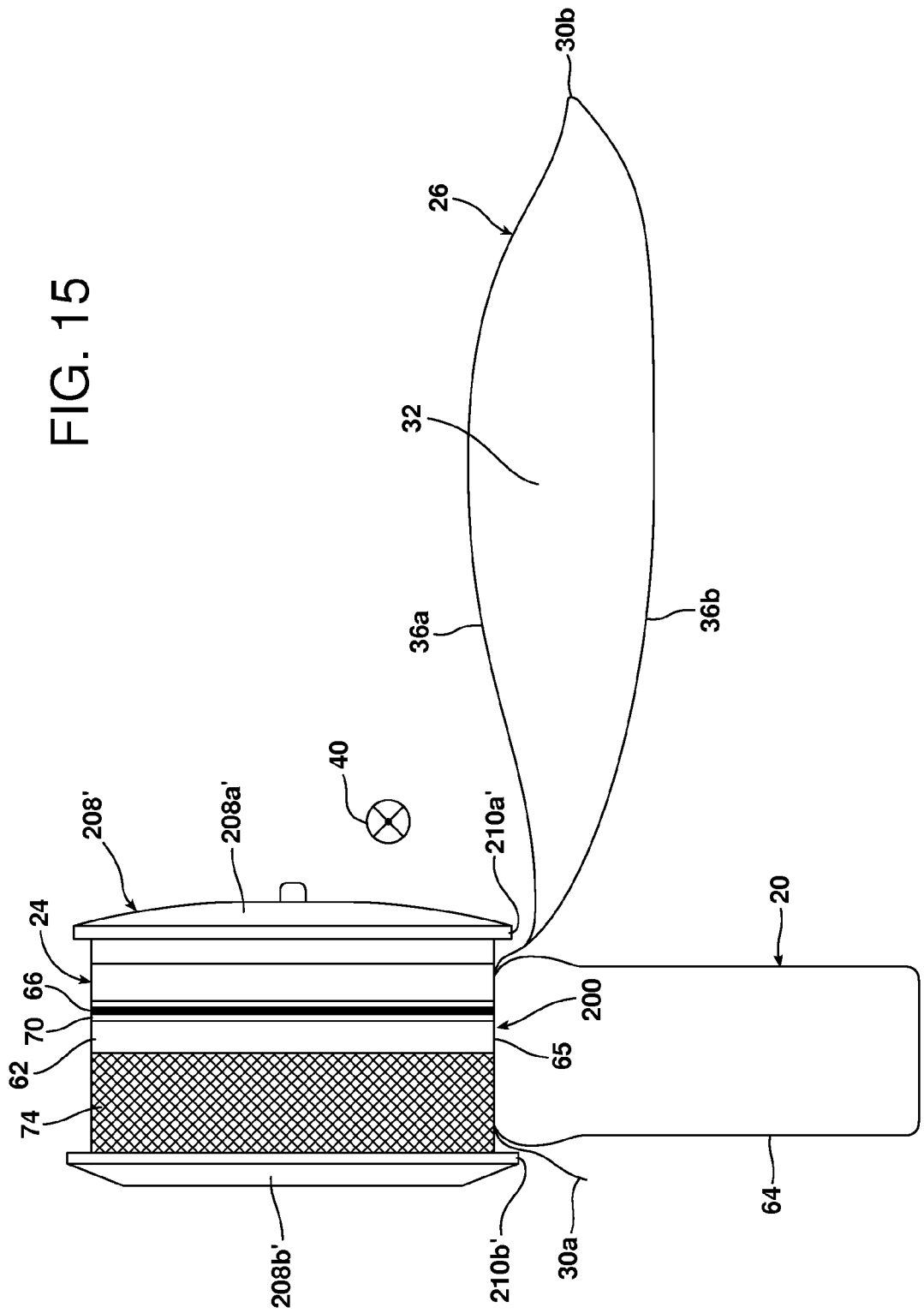
FIG. 15 is an elevational view of an alternative web guide embodiment.

In the presently-illustrated embodiment, the sealing device 24 and web conveyance system 20 are incorporated together as an integrated assembly, which may include a pair of convergent, counter-rotating rotary members, e.g., rollers 62, 64, and a sealing element 66 secured to at least one of the rollers, e.g., to roller 62 as shown in FIG. 3. Rollers 62, 64 may be positioned such that a nip 65, i.e., an area of tangential contact, is formed therebetween (FIGS. 14-16). At least one of the rollers may be linked to a motor 68, e.g., a motor and gearbox assembly 68 as shown in FIG. 5, such that, when power is supplied to one or both rollers, the rollers rotate in opposing directions as indicated in FIG. 13 so that web 26 is advanced along path 40 when the web passes through the nip 65 between the rollers (FIGS. 2 and 14). Simultaneous with such web conveyance, sealing element 66 forms longitudinal seal 48 at the nip between rollers 62, 64 to close the openings 34 of the inflated containers 32/50 as web 26 is advanced along path 40 (FIG. 11).

Sealing element 66 may be an electrically-heated resistive device, such as a band or wire, which generates heat when an electrical current passes through the device. As shown perhaps most clearly in FIGS. 11 and 15, it may be seen that sealing element 66 may be mounted on the circumferential outer surface 72 of roller 62, such that it rotates against the web 26 along with the roller 62. When sealing element 66 is mounted on roller 62 as presently illustrated, roller 62 may be considered a "sealing roller" while roller 64 is considered a "backing roller." When heated, the rotational contact between sealing element 66 and web 26, as rollers 62, 64 counter-rotate compressively against web 26, forms the longitudinal seal 48 as the web is conveyed along its path of travel 40.

In the illustrated embodiment, sealing element 66 is in the form of a wire. Sealing roller 62 may be formed from any material that is capable of withstanding the temperatures generated by the sealing element, such as metal (e.g., aluminum), high-temperature-resistant polymers (e.g., polyimide), ceramics, etc. A groove 70 may be provided in the circumferential outer surface 72 of roller 62 to accommodate sealing element 66 and keep it in proper position on the outer surface 72 during sealing and conveyance.

The outer surface 72 may include a roughened or knurled section 74 to facilitate traction between surface 72 and the web 26 in order to prevent or minimize slippage between the sealing roller 62 and the web as the roller rotates against the web to convey it along path 40. Web traction between rollers 62, 64 may further be facilitated by forming backing roller 64 from a pliant material, such as rubber or RTV silicone.

With particular reference to FIGS. 1-5 and 11, it may be seen that web conveyance system 20 may include rollers 62, 64, motor 68, and drive shaft 75, which extends through wall 16 to couple the rotational output of motor 68 to sealing roller 62. In this arrangement, sealing roller 62 is directly driven by motor 68 via drive shaft 75, while backing roller 64 is indirectly driven by the motor, based on its rotational contact with the driven roller 62. Sealing device 24 may, in addition to sealing element 66 and groove 70 on outer surface 72 of sealing roller 62, include commutators 76a, b (e.g., carbon-brush commutators) and corresponding sliprings 78a, b (FIG. 11) in order to supply electricity to the sealing element 66 via internal wiring within drive shaft 75 and sealing roller 62.

Further details regarding the above-described integrated web conveyance system 20 and sealing device 24 are disclosed in U.S. Pat. No. 7,225,599, the entire disclosure of which is hereby incorporated herein by reference thereto.

As shown in FIGS. 2 and 11, longitudinal seal 48 is oriented in a direction that is substantially parallel to the longitudinal edges 30a, b of web 26 and its direction of movement along its travel path 40 through machine 10. Seal 48 may, as shown, be a continuous longitudinal seal, i.e., a substantially linear, unbroken seal, which is interrupted only when the sealing device 24 is caused to stop making the seal.

Alternatively, sealing device 24 may be adapted to produce longitudinal seal 48 as a discontinuous series of longitudinal seal segments. A discontinuous series of longitudinal seal segments may be produced when sealing element 66 has a helical pattern on surface 72 of sealing roller 62 (or 64), resulting in an angled configuration of the longitudinal seal segments, e.g., as disclosed in the above-referenced '599 patent. As a further alternative, sealing element 66 may be arranged on sealing roller 62 as an overlapping helical pattern, e.g., as a 'double helix,' as disclosed in U.S. Pub. No. 2008-0250753 A1, the disclosure of which is hereby incorporated herein by reference thereto.

Figure 4:
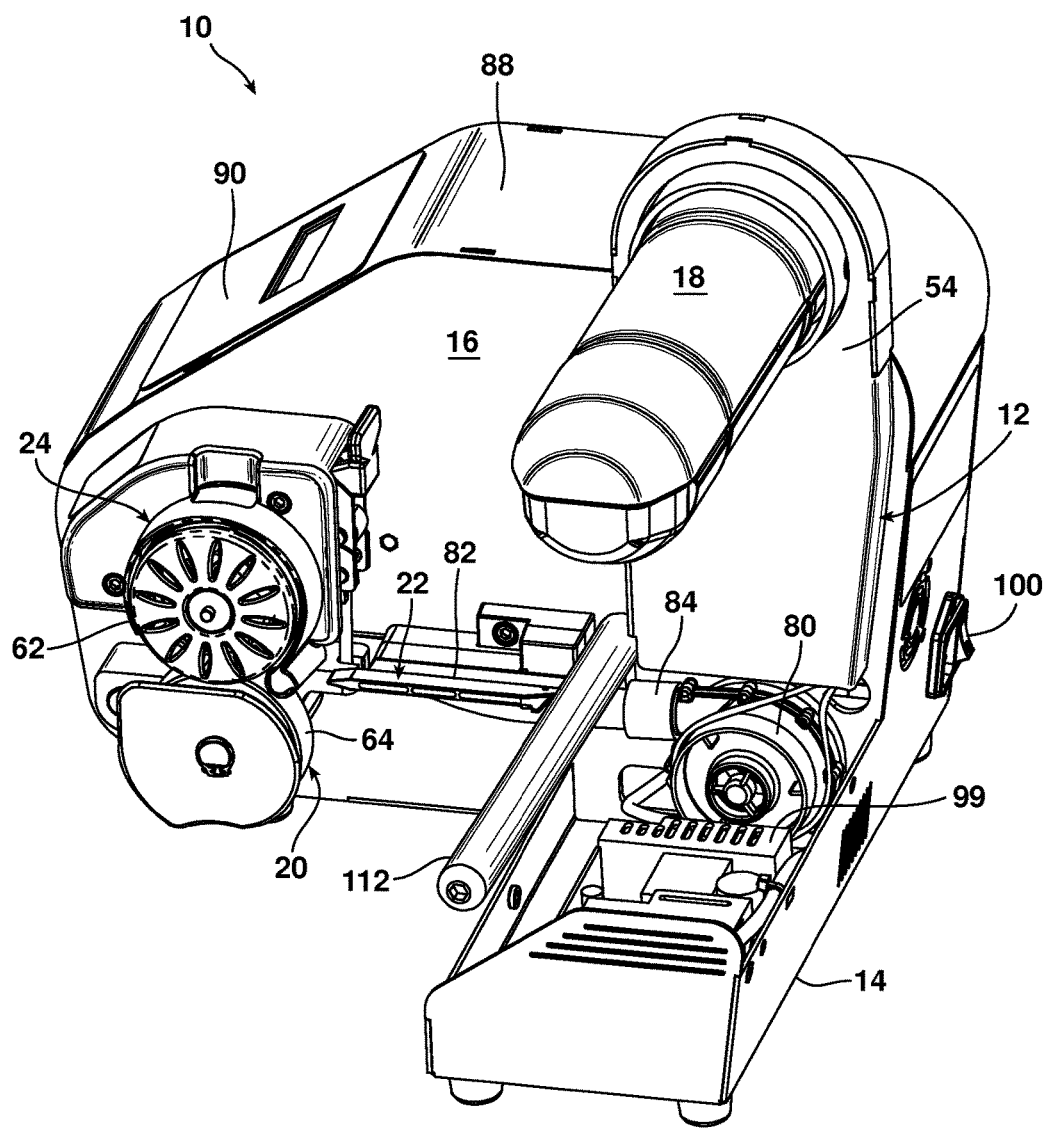
FIG. 4 is similar to FIG. 1, except that the blower cover has been removed to show the blower.

Gas stream 46 may comprise air. In this instance, inflation system 22 may include a blower 80 (FIGS. 4-6) for generating such gas stream 46 from the ambient air, an inflation nozzle 82, and a gas duct 84 to direct gas 46 from blower 80 to nozzle 82. In FIG. 4, blower cover 86 has been removed to show that blower 80 may be positioned on base 14 proximate nozzle 82 for maximum air delivery (i.e., minimum pressure loss) and speed. Nozzle 82 may be secured in position to direct gas (e.g., air) 46 into the openings 34 of the containers 32 via direct or indirect attachment to wall 16 and/or base 14. In the illustrated embodiment, nozzle 82 is attached to duct 84, and is further supported via attachment to wall 16.

Figure 6:
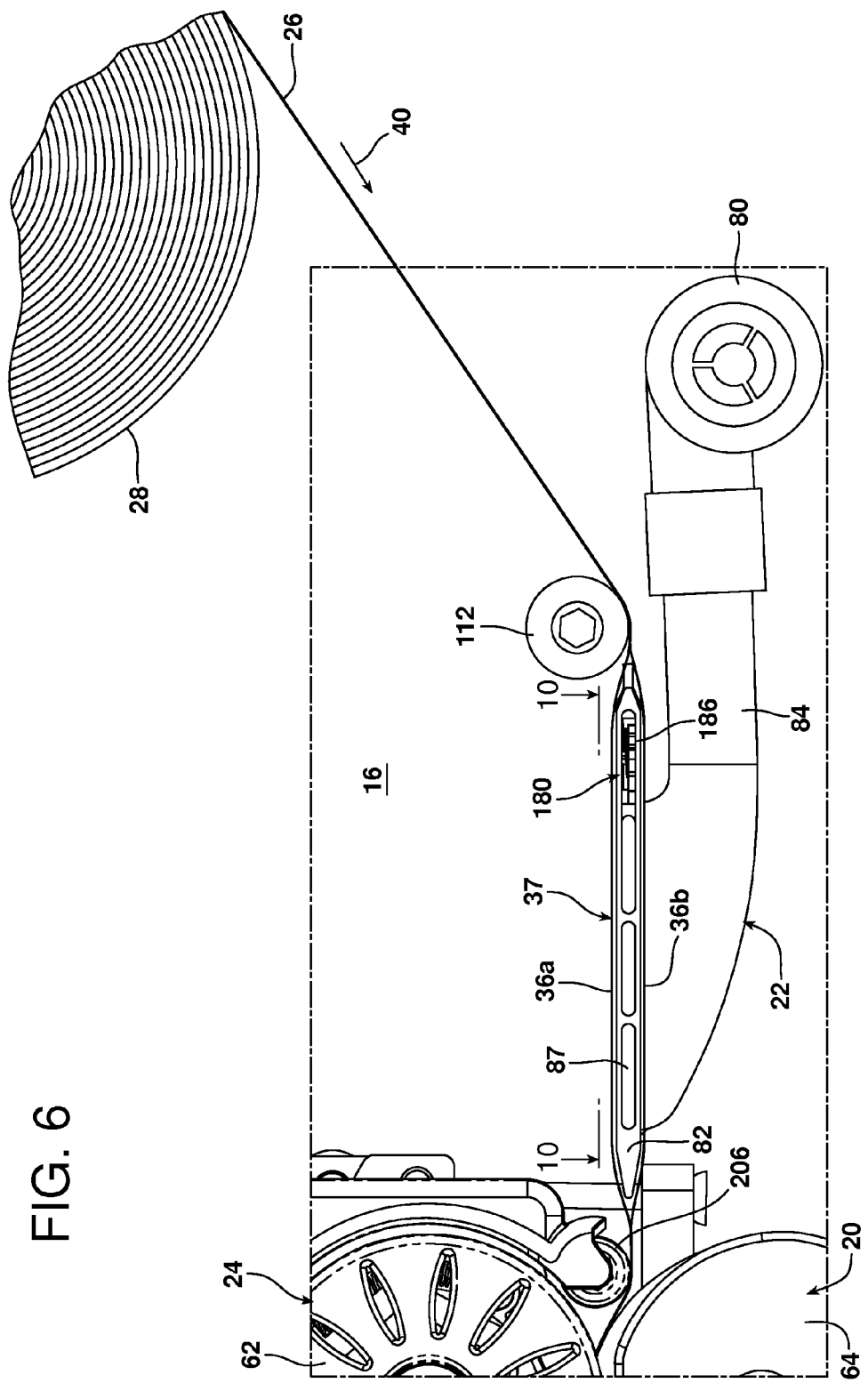
FIG. 6 is a partial elevational view, taken along lines 6-6 in FIG. 2.

FIG. 6 is a view of FIG. 2 along lines 6-6 thereof, and shows the conveyance of inflatable web 26 through inflation system 22, including the separation of film sheets 36a, b at open skirt region 37 to move against/around opposing surfaces of the inflation nozzle 82. FIG. 6 also shows that inflation nozzle may have a relatively flat/planar configuration, and may contain one or more gas outlets 87, e.g., three such outlets as shown.

Machine 10 may include a housing 88, e.g., on the opposite side of wall 16 from that with which the web-handling components (i.e., spool 18, inflation system 22, rollers 62, 64, etc.) are associated. The housing 88 may contain therein various operational devices, some of which are described above (e.g., motor 68), and some of which will be described below. Housing 88 may also contain thereon an operator interface, e.g., a control panel 90, which may include, at a minimum, a start button or switch 91 and a stop button or switch 92, which allows the operator of machine 10 to cause the machine to start operations and stop operations, respectively.

Machine 10 may further include a controller 94 to control the overall operation of the machine. The controller may be contained within housing 88 as shown in FIG. 5. Controller 94 may be in operative communication with the various sub-assemblies of machine 10, inter alia, to control the flow of power, e.g., electricity, thereto. Such control may take place indirectly, e.g., by controlling the flow of power to the sub-assemblies from a separate power management source (not shown), or, as illustrated, directly. Thus, power may be supplied to controller 94 from junction box 96 via electrical cable 98. Junction box 96 may be supplied with power via a separate power cable (not shown), which connects the junction box to a power supply, e.g., a plug-in wall receptacle (not shown), which is linked to a source of electricity, and may include an 'on-off' switch 100, to energize and de-energize, respectively, controller 94. In one example, when the source of electricity is alternating current, e.g., 110 or 220 volt AC, a transformer 99 may be included in machine 10 (FIG. 4) to convert such AC current into DC current, e.g., 24 volt DC, prior to such current being supplied to controller 94 via cable 98.

Various additional electrical cables (e.g., insulated wires) may be provided to allow controller 94 to electrically communicate with the sub-assemblies in machine 10 in order to control the operations thereof. Thus, cable 102 may be supplied to allow controller 94 to communicate with motor 68, i.e., to control the web conveyance system 20 in order to achieve, e.g., a desired rate of web conveyance, a desired stoppage point, a desired re-start, etc. Similarly, cable 104 may allow controller 94 to communicate with blower 80, e.g., to energize/de-energize the blower, control the rate of movement of gas 46, etc. Cable 106 may provide communication between control panel 90 and controller 94, e.g., in order to allow an operator to supply commands, e.g., 'stop' and 'start' commands, to the controller. Cable 108 may provide communication between controller 94 and commutators 76a, b, i.e., to control the sealing device 24 by, e.g., energizing/de-energizing sealing element 66, controlling the amount of power supplied thereto, etc. Further sub-assembly control links are described below.

Figure 7:
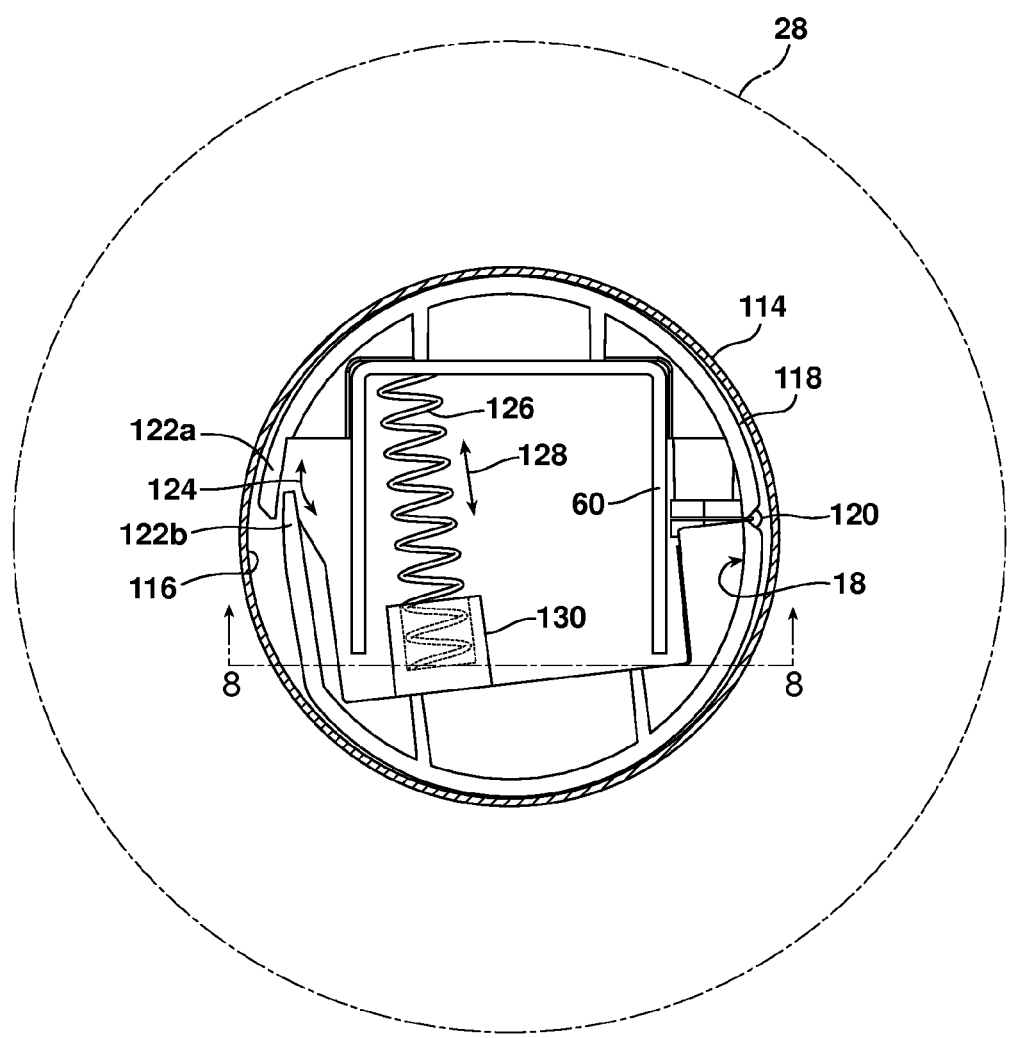
FIG. 7 is a cross-sectional view of the spool, taken along lines 7-7 in FIG. 1.

With reference to FIGS. 2 and 6-7, a further feature of the invention will be described. When web 26 is in the form of a roll 28 as shown, the force required to withdraw the web from the roll by web conveyance system 20 may change as the roll is depleted, such that the tension in web 26 may vary as the roll depletes. Such variation in web tension can contribute to mis-alignment of the web vis-à-vis the inflation system 22 and sealing device 24. Such mis-alignment, in turn, can result in a number of inflation and/or sealing problems, including non-inflation of the containers, under-inflation of the containers, and seal failures, i.e., incomplete or no sealing of those containers that are inflated (resulting in the deflation of such containers). Accordingly, machine 10 may further include one or more tension-control devices for controlling the tension in web 26 as it is conveyed along path 40 through the machine. Such devices may operate by applying frictional resistance to the web 26 in opposition to the advancement thereof by conveyance system 20.

One such device is illustrated in FIG. 6, wherein, as shown, a tension rod 112 may be positioned between roll 28 and inflation system 22, and may be structured and arranged to be in contact, e.g., sliding contact, with web 26 as it is conveyed along path 40. The sliding contact between tension rod 112 and web 26 provides frictional resistance to the web in opposition to its advancement along path 40. The magnitude of such frictional resistance is directly proportional to the extent of the contact between the web 26 and rod 112. In the illustrated arrangement, as the diameter of roll 28 decreases with depletion of its supply of web 26, the area of contact between web 26 and rod 112 increases, based on the increased angle of approach of the web onto the tension rod from roll 28. Conveniently, the tension rod 112 may also provide the function of a guide rod, in that it directs the web 26 into proper position on inflation nozzle 82. The tension rod 112 may have a substantially round or oval cross-sectional shape as shown. Various other shapes are, of course, possible, and within the scope of the present invention, e.g., square, rectangular, triangular, etc.

As an alternative, or in addition, to the tension rod 112, a further means for controlling the tension in web 26 may be included, as shown in FIG. 7. FIG. 7 is a cross-sectional view of spool 18 taken along lines 7-7 in FIG. 1, with roll 28 added in phantom for reference. Roll 28 may include a core 114 having an inner diameter 116, and spool 18 may include a contact surface 118, which may be the outermost surface of the spool. When a roll 28 is supported by spool 18, the contact surface 118 thereof is in contact with the inner diameter 116 of core 114. Spool 18 may be non-rotatably attached to wall 16/upright bracket 54 such that roll 28 rotates thereagainst, i.e., with the core 114 of roll 28 rotating frictionally against the contact surface 118 of spool 18, thereby applying frictional resistance to the advancement of web 26 by conveyance system 20.

In some embodiments of the invention, such frictional resistance may be increased by structuring and arranging spool 18 such that the contact surface 118 thereof exerts an outwardly-biased force against the inner diameter 116 of core 114. This may be accomplished by structuring spool 18 to be outwardly movable, e.g., along axial pivot member (e.g., hinge) 120 as shown in FIG. 7, with the spool 18 comprising a pair of sections 122a, b, which may move relative to each other in a clamshell fashion, e.g., arcuately in the direction of arrow 124, along pivot member 120. Thus, as illustrated, sections 122a, b may be separate and connected to one another substantially only along pivot member 120. Further, sections 122a, b may be biased away from one another by including a resilient member 126 inside of spool 18, which exerts an outwardly-biased force 128 against sections 122a, b. Such force 128 is manifested by sections 122a, b along arc 124, such that the contact surface 118 of spool 18 exerts the outwardly-biased force 128 against the inner diameter 116 of core 114. In this manner, the contact surface 118 exerts a frictional force against the rotation of the roll 28 as web 26 is conveyed through machine 10, which provides consistency to the tension in the portion of the web that is being conveyed through the machine.

In the illustrated embodiment, the resilient member 126 may be retained at one end in mounting boss 130 in 'lower' section 122b, with the opposing end pushing against 'upper' section 122a via contact with framework 60, to which section 122a may be attached such that lower section 122b is movable relative to support structure 12 while upper section 122a is stationary relative to the support structure. The resilient member 126 may comprise any object or device capable of exerting an outward force, such as one or more springs, foams, etc. As illustrated, member 126 is in the form of linear coil spring, but could also be a torsion spring, e.g., positioned at pivot member 120, a leaf spring, etc. As an alternative to the illustrated 'clamshell' configuration, sections 122a, b can be configured in a variety of other arrangements, e.g., such that the two sections are linearly (instead of pivotally) movable relative to one another. The spool 18 may have a constant outer diameter such that contact surface 118 is relatively uniform or, alternatively, may have a variable diameter such that the contact surface 118 is non-uniform.

If the foregoing structure for spool 18 is not needed for tension control, then spool 18 may, e.g., be rotatably mounted to the wall 16/upright bracket 54 such that the roll 28 rotates with the spool as the spool rotates relative to the wall/bracket.

Figure 8:
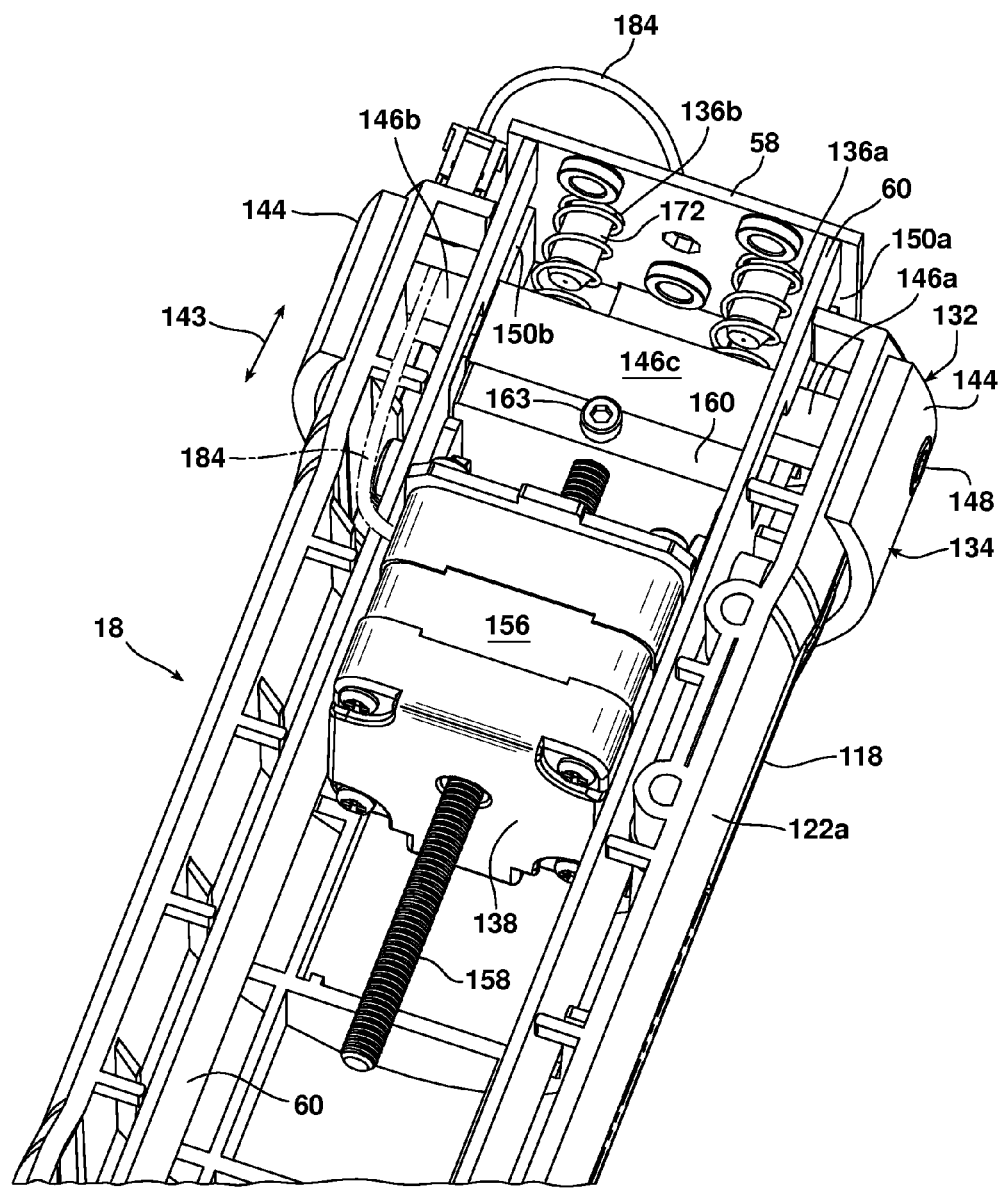
FIG. 8 is a perspective view of the spool, taken along lines 8-8 in FIG. 7.

FIG. 8 is a perspective view of the inside of spool 18, as taken along lines 8-8 in FIG. 7 and with 'lower' movable section 122b pivoted fully away from 'upper' movable section 122a in order to show additional internal components that may be included in the spool. As noted above, spool 18 may include an internal framework 60, to which such internal components of the spool may be affixed, and a mounting plate 58, for attachment of the spool to upright bracket 54 (see, FIG. 3). Contact surface 118 may also be attached to framework 60 such that the contact surface is external to the framework. In the illustrated embodiment, the upper section 122a is directly attached to framework 60, while the lower section 122b is indirectly attached via its attachment to upper section 122a at pivot member 120.

With collective reference now to FIGS. 3 and 8, in accordance with an advantageous feature of the invention, machine 10 may include a positioning mechanism 132, which is structured and arranged to establish a position of the roll 28 on spool 18. The positioning mechanism 132 may generally comprise an engagement member 134 and an actuator 138.

As shown in FIG. 3, engagement member 134 is interposed between the roll 28 and support structure 12 (upright bracket 54 thereof) at the proximal end 52a of spool 18. Engagement member 134 is adapted to engage roll 28, and is structured and arranged to be movable relative to spool 18, as indicated by the two-way arrow 143 (FIG. 8). Actuator 138 is structured and arranged to move engagement member 134 relative to the spool 18, e.g., bi-directionally as indicated by arrow 143. In this manner, the engagement member 134 and actuator 138 cooperatively establish the position of roll 28 on spool 18.

For those embodiments in which the distal end 52b of spool 18 has a higher elevation relative to the proximal end 52a, spool 18 has an upward angle (relative to a horizontal plane) as the spool extends away from upright bracket 54. In such embodiments, web roll 28 is gravitationally biased towards bracket 54 of support structure 12, as indicated by arrow 140, which represents the force vector of the gravitational bias that acts on roll 28 as mounted on angled spool 18. Based on the interposition of engagement member 134 between roll 28 and upright bracket 54, such gravitational bias 140 results in roll 28 being forced against the engagement member (i.e., by gravity).

Positioning mechanism 132 may further include a biasing element 136, e.g., a pair of biasing elements 136a, b as shown. Biasing elements 136a, b may be retained on or secured to mounting plate 58 as shown, e.g., via retainers 172 or the like, and may provide the function of biasing the engagement member 134 away from support structure 12/proximal end 52a of spool 18 and towards actuator 138/distal end 52b. When spool 18 has an upward angle as shown, such bias of engagement member 134 away from support structure 12 results in engagement member 134 exerting a force 142 against roll 28, which opposes the gravitational force 140 of the roll against the engagement member, plus any excess force applied by the roll during the loading thereof onto spool 18 (described in further detail below). The biasing element(s) 136 may comprise any suitable resilient device, such as a spring (as illustrated), foam, gas-filled bladder, etc.

With additional reference now to FIGS. 9-9C, positioning mechanism 132 will be described in further detail. Engagement member 134 may comprise a contact ring 144 and a guide bar 146, with the contact ring 144 being attached to the guide bar via fasteners (e.g., screws) 148. Contact ring 144 is the portion of engagement member 134 that engages, e.g., is in physical contact with, roll 28 (FIG. 9B), and may be coaxial with spool 18 and external to contact surface 118 thereof (FIG. 8). Guide bar 146 may be structured and arranged to be linearly movable within a track 150, which may comprise a pair of opposing slots 150a, b in internal framework 60 (see, FIGS. 8 and 9A). Guide bar 146 may comprise a pair of 'wing' sections 146a, b, which extend from a center section 146c, with wing sections 146a, b riding in respective slots 150a, b and center section 146c moving within the internal framework 60. In this embodiment, track 150 thus constrains the movement of guide bar 146, and therefore of contact ring 144 attached thereto at wing sections 146a, b, to linear movement, i.e., in the form of translational movement along, and delimited by, slots 150a, b.

Figure 9:
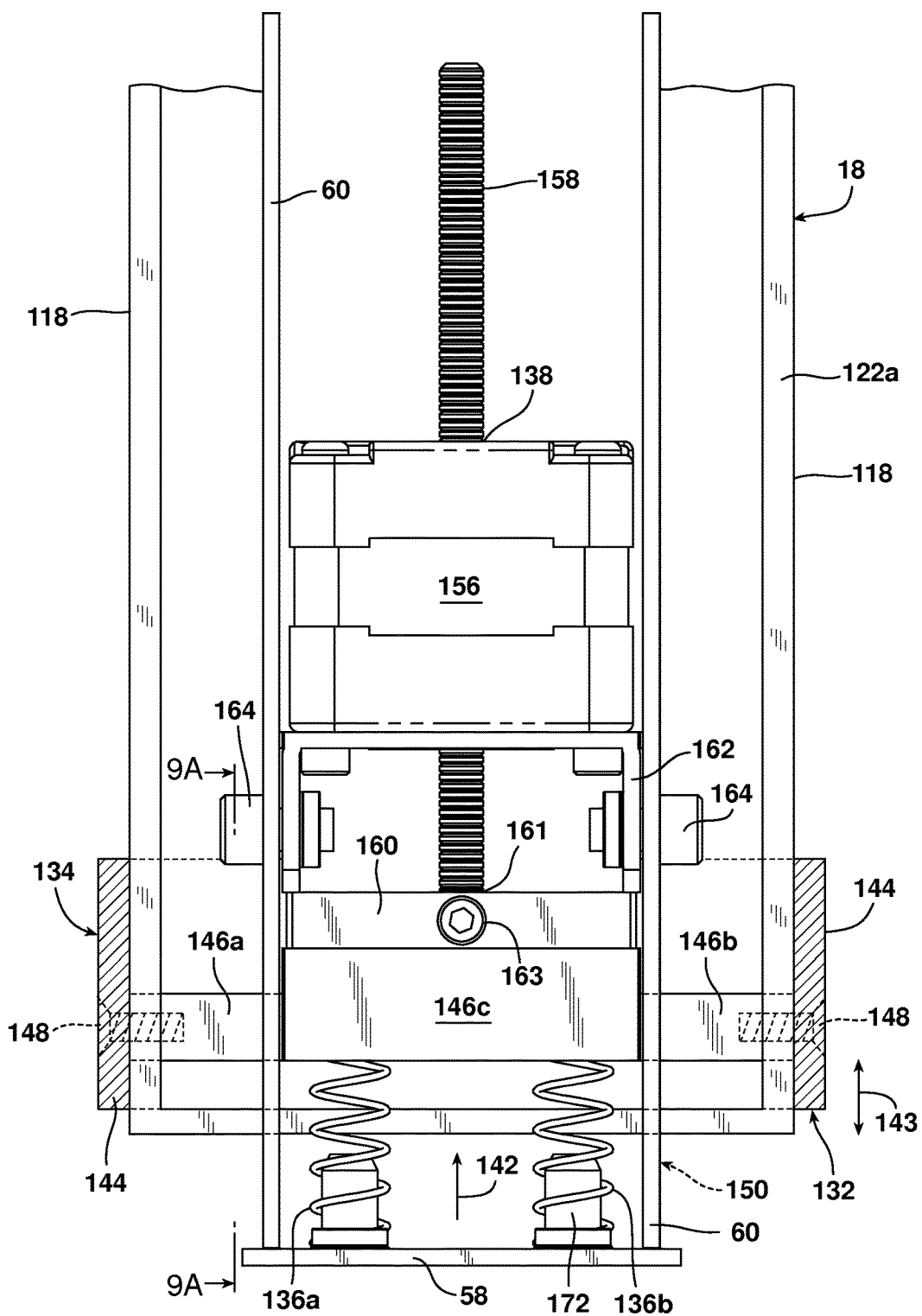
FIG. 9 is plan view of the spool as shown in FIG. 8.
Figure 9A:
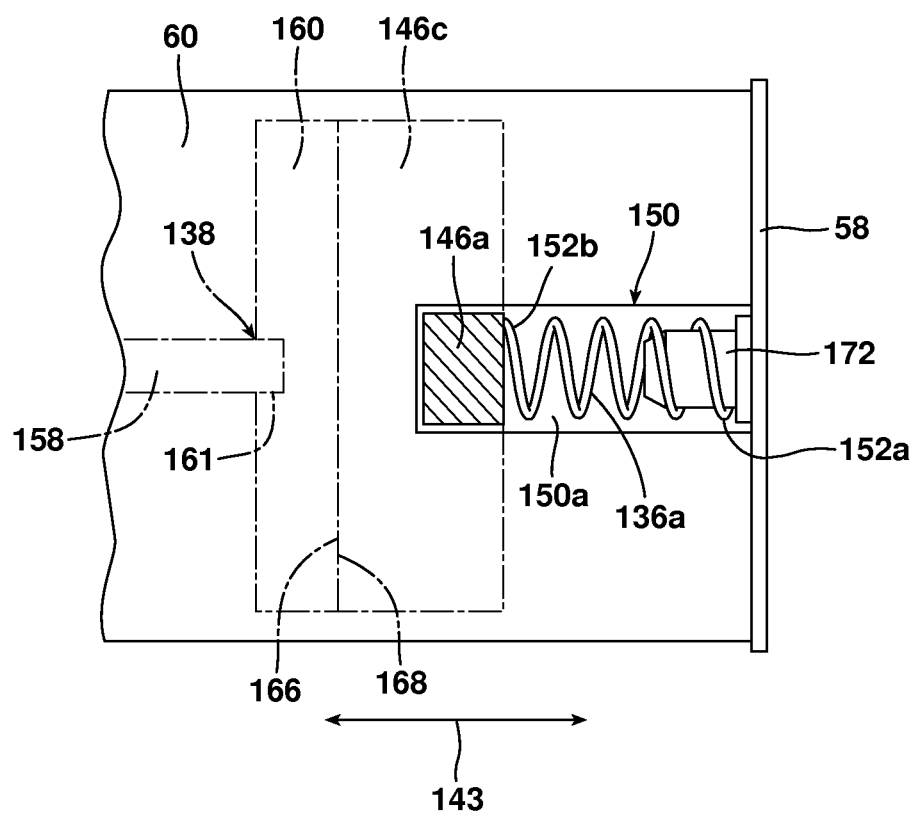
FIG. 9A is a partial elevational view of the spool, taken along lines 9A-9A in FIG. 9.

With reference to FIG. 9A, it may be seen that the biasing element(s) 136 may include a first end 152a and a second end 152b (only biasing element 136a is visible in FIG. 9A). The first end 152a exerts a force against support member 12, e.g., via mounting plate 58, which is attached to the support member. The second end 152b exerts an opposing force against guide bar 146, e.g., via direct contact therewith by second end 152b, and thereby biases the guide bar towards actuator 138 and distal end 52b of spool 18. When a roll 28 is supported on an upwardly-angled spool 18 as illustrated in FIG. 3, the biasing force exerted by the second end 152b of the biasing elements 136 on guide bar 146 will constitute the above-described force 142 exerted by engagement member 134 against roll 28, in opposition to the gravitational force 140 of the roll against the engagement member.

The inventors hereof have identified a problem associated with inflation and sealing machines. In many instances, operators of such machines have been found to apply excessive force when loading new film rolls onto the spools of the machines, such that the roll makes a rather hard impact with the machine at the proximal end of the spool. Such excessive force can damage the machine, particularly when repeated over time. It has been determined that such damage will most often be manifested at actuator 138, particularly if the actuator is rigidly coupled to engagement member 134, such that most of the roll's force is transferred to the actuator during the loading process.

Figure 9B:
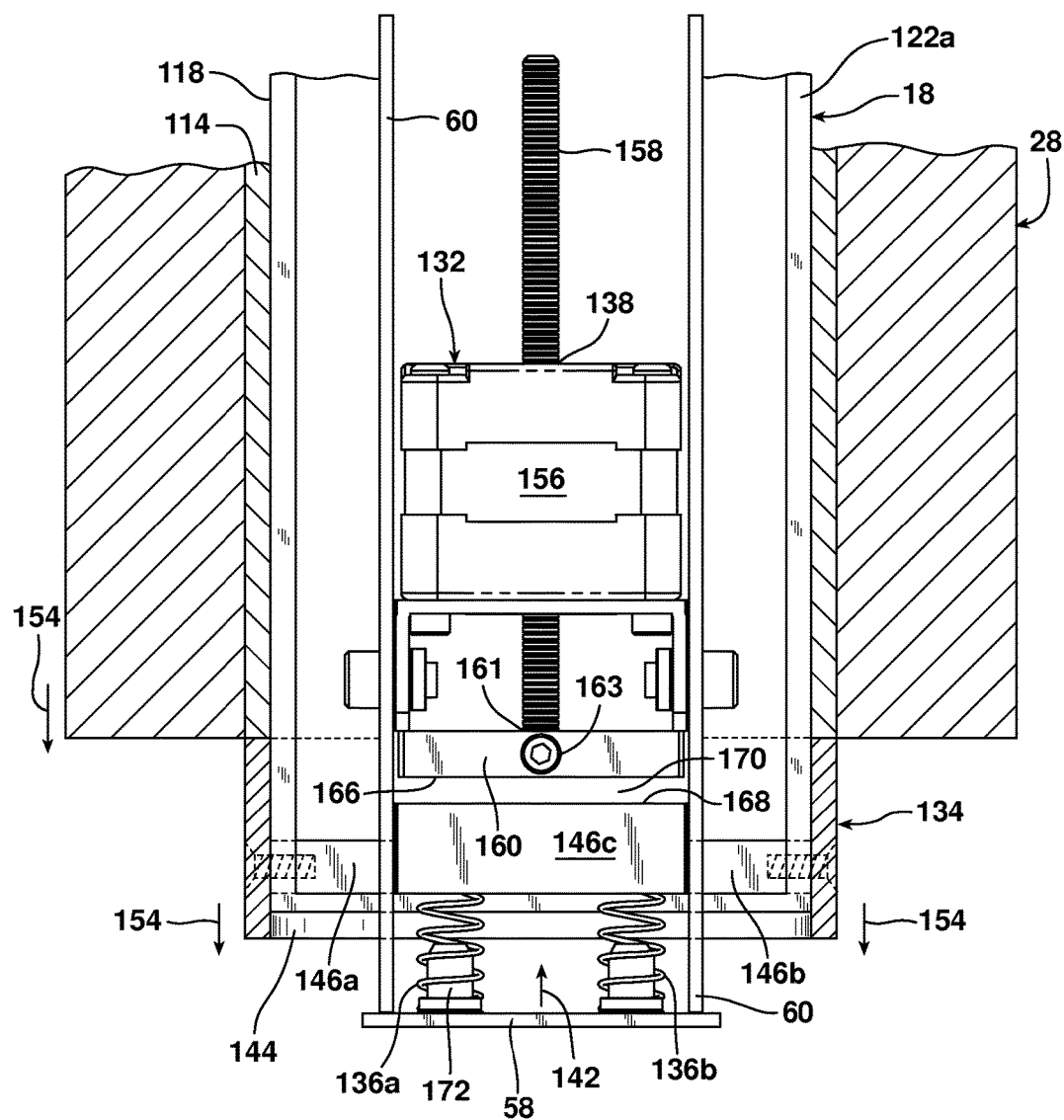
FIG. 9B is similar to FIG. 9, showing a roll being loaded onto the spool.

Advantageously, the positioning mechanism 132 in accordance with the present invention provides a solution to the foregoing problem, whereby engagement member 134 and actuator 138 are configured such that the two components separate from one another when a force, e.g., as exerted by roll 28 on engagement member 134, exceeds a predetermined amount, which will generally occur when excessive force is applied during the roll-loading operation. This is illustrated in FIG. 9B, wherein a roll 28 is being loaded onto spool 18, causing force 154 to be exerted against the engagement member 134. Force 154 is the total of the force contributed by the operator (not shown) from loading roll 28 onto spool 18, plus gravitational force 140 when spool has an upward angle. FIGS. 9 and 9C illustrate two steady-state conditions of positioning mechanism 132. FIG. 9 shows the 'pre-load' steady-state condition, i.e., prior to roll 28 being loaded onto spool 18. FIG. 9C illustrates the 'post-load' steady-state condition, i.e., after roll 28 has been loaded onto the spool and the force 154 associated with such loading has dissipated. In both of such steady-state conditions, it may be seen that actuator 138 is in contact with engagement member 134. FIG. 9B illustrates a transitory state of positioning mechanism 132, i.e., the loading of roll 28 onto spool 18, during which the actuator 138 and engagement member 134 separate from one another, thereby separating the roll-loading force 154 from actuator 138, which prevents force 154 from damaging the actuator.

As noted above (and described in further detail below), the function of actuator 138 is to move engagement member 134 relative to spool 18, to thereby establish the position of roll 28 on the spool. Actuator 138 may comprise a motor 156, a drive screw 158 extending through the motor, and a contact member 160 attached to a distal end 161 of the drive screw, e.g., via set screw 163 as shown, with the distal end 161 of drive screw 158 being embedded inside of contact member 160 (FIG. 9A) and set screw 163 securing the distal end 161 therein. The motor 156 may be secured to internal frame 60 via mounting bracket 162 and fasteners 164 (FIG. 9). In order to accurately position roll 28 on spool 18 for optimum inflation and sealing, motor 156 is preferably a precision-type motor, e.g., a rotary-to-linear motor capable of precise positioning, such as a stepper motor. Compared to, e.g., drive motor 68, precision motors such as motor 156 are relatively delicate and susceptible to damage from impact-type forces, e.g., as would be experienced from an excessive loading force being applied to roll 28. Such damage may be prevented by isolating the motor 156 from force 154, which may be achieved by configuring actuator 138 and engagement member 134 to separate from one another when a force, e.g., force 154 exerted by roll 28 on engagement member 134, exceeds a predetermined amount, e.g., biasing force 142.

In the illustrated embodiment, contact member 160 of actuator 138 and guide bar 146 of engagement member 134 have respective opposing surfaces 166, 168, which are shaped and relatively positioned to engage one another, i.e., to be in contact with one another, when positioning mechanism 132 is in a steady-state condition, i.e., either a pre-load (FIG. 9) or post-load (FIG. 9C) condition, but also to disengage from one another to form a gap 170 therebetween when a roll 28 is being forcefully loaded onto spool 18 such that the positioning mechanism 132 is in a transitory condition (FIG. 9B), i.e., with loading force 154 being applied to engagement member 134 such that the force 154 exceeds the opposing biasing force 142. In the illustrated embodiment, surfaces 166, 168 are both flat, but other shapes are possible, e.g., various three-dimensional shapes that disengageably conform to one another, such as a concave-convex relationship. By comparing FIGS. 9 and 9B, one can also see the movement of the entire engagement member 134 as a result of forceful roll loading, from its starting position in FIG. 9 to its displaced position along spool 18 towards mounting plate 58 in FIG. 9B due to loading force 154 being exerted on the engagement member, with the leading end of contact ring 144 extending beyond the corresponding end of section 122a of spool 18.

As noted above, biasing elements 136a, b may be included to provide the function of biasing the engagement member 134 away from support structure 12 (via mounting plate 58) and towards actuator 138. In the illustrated embodiment, the biasing force of biasing elements 136 and overall configuration of positioning mechanism 132 are such that, when positioning mechanism 132 is in a steady-state condition, i.e., either pre-load (FIG. 9) or post-load (FIG. 9C), the biasing elements 136 urge guide bar 146 into engagement, i.e., contact, with contact member 160, so that the respective surfaces 168, 166 thereof are pressed together. The amount of such biasing force 142 may thus define the predetermined minimum amount of force required to cause engagement member 134 to separate from actuator 138, and thereby produce gap 170, as shown in FIG. 9B. For example, when the force 154 exerted by roll 28 on engagement member 134, e.g., during loading, exceeds the biasing force 142 exerted by biasing elements 136 on the engagement member 134 against actuator 138 in the steady-state condition of positioning mechanism 132, actuator 138 and engagement member 134 separate from one another, thereby producing gap 170, as shown in FIG. 9B.

In the illustrated embodiment, the biasing elements 136 are in the form of springs, such that the biasing force 142 urging the guide bar 146 into engagement with contact member 160 in the pre-load and post-load steady-state conditions of the positioning mechanism 132 (FIGS. 9 and 9C) is a spring force. Alternatively, guide bar 146 and contact member 160 could be urged (disengageably held) together, e.g., via a mechanical or magnetic union.

During the transient state shown in FIG. 9B, loading force 154 temporarily exceeds the opposing biasing force 142, which had been holding respective surfaces 166, 168 of contact member 160 and guide bar 146 together. In this state, roll 28 and engagement member 134 are thus accelerating towards mounting plate 58/support structure 12, as propelled by the loading force 154. Such acceleration will not damage actuator 138, however, given that the entirety of the force 154 has been de-coupled from the actuator 138 as a result of the separation of the engagement member 134 from the actuator 138 during the loading process.

When included, biasing element 136, e.g., the pair 136*a*, *b* thereof, may advantageously provide the function of controlling the movement of roll 28 when actuator 138 and engagement member 134 are separated from one another. By biasing the engagement member 134 towards actuator 138, the biasing force 142 generated by biasing element 136 will preferably be sufficient to absorb at least some, e.g., a substantial amount or all, of force 154, to thereby control the movement of the roll 28 during the transitory phase of separation of actuator 138 from engagement member 134, e.g., by decelerating/dampening the movement of the roll 28/engagement member 134 along force vector 154 in order to stabilize the roll and engagement member, and then move the roll and engagement member along force vector 142 to re-establish contact between the engagement member 134 and actuator 138. In this manner, biasing element(s) 136 may restore machine 10 to a stable/operational run condition, with loading force 154 neutralized, by controlling the movement of roll 28 and returning positioning mechanism 132 to a steady-state position, i.e., the post-loading position as shown in FIG. 9C, in which the opposing surfaces 166, 168 of contact member 160 and guide bar 146 are once again held together by the biasing elements.

Figure 9C:
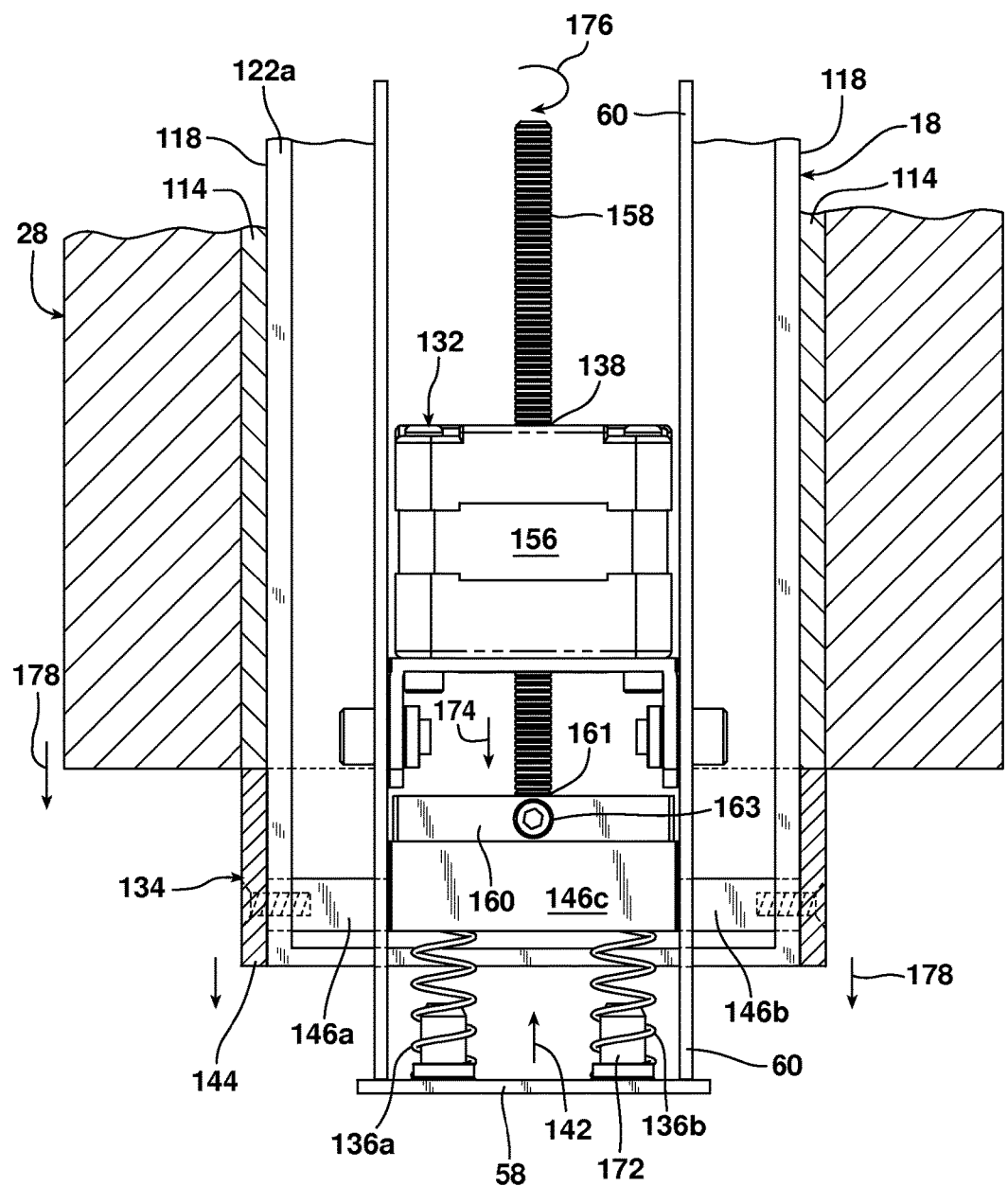
FIG. 9C is similar to FIG. 9B, showing the position of the roll being adjusted.

Referring now to FIG. 9C, the roll-positioning operation of positioning mechanism 132 in a steady-state 'post-loading' condition will be described in further detail. As noted above, the function of actuator 138 is to move engagement member 134 relative to spool 18 to thereby establish the position of roll 28 on the spool. As will be described below, the purpose of this is to ensure that the open longitudinal edge 30*a* and/or first ends 42*a* of transverse seals 38 of web 26 are optimally aligned relative to inflation system 22 and sealing device 24 for proper inflation and sealing of containers 32.

In the steady-state condition shown in FIG. 9C, following the transitory condition of roll-loading as shown in FIG. 9B, the surfaces 166, 168 of contact member 160 and guide bar 146 are once again held together by the biasing force 142 exerted against the guide bar by biasing elements 136*a*, *b*, so that actuator 138 and engagement member 134 resume engagement with one another. In order to move engagement member 134 in such steady-state condition to establish an optimal position of roll 28, actuator 138 is adapted to exert a force 174 against guide bar 146, which opposes the biasing force 142 exerted against the guide bar by the biasing element(s) 136. Actuator 138 may include any conventional drive means, including mechanical, electrical, and/or hydraulic drive means. As noted above, in the illustrated embodiment, actuator 138 is in the form of a linear actuator, including a motor 156, a drive screw 158 extending through the motor, and a contact member 160 attached to a distal end 161 of the drive screw, e.g., via set screw 163 as shown. The motor 156 is a rotation-to-translation type of motor, e.g., a stepper motor, and moves contact member 160 either towards or away from mounting plate 58/support structure 12, as indicated by double-headed arrow 143 (FIG. 9A), by generating clockwise or counter-clockwise rotation of drive screw 158.

An example of the operation of positioning mechanism 132 in a steady-state 'post-loading' condition may be understood by viewing FIGS. 9, 9B, and 9C sequentially. FIG. 9 shows a starting position for the positioning mechanism, i.e., with no roll on spool 18 and the actuator 138 and engagement member 134 in contact with one another due to the force 142 exerted by the biasing element 136. FIG. 9B shows a transitory condition for positioning mechanism 132 when loading force 154 is applied to the positioning mechanism from loading roll 28 onto spool 18, resulting in the separation of engagement member 134 from actuator 138. During such separation, the position of the engagement member 134 changes from the starting position in FIG. 9 (moves towards mounting plate 58/support structure 12), but the position of the contact member 160 does not change, given that actuator 138 is not involved in the roll-loading process.

After steady-state has been restored by biasing element 136, with loading force 154 dissipated and the movement of roll 28 associated with force 154 eliminated, the positioning mechanism 132 is in a state of readiness to adjust the position of roll 28 on spool 18. In FIG. 9C, the positioning mechanism is in the process of making such an adjustment. The motor 156 is causing drive screw 158 to rotate in the direction of arrow 176, i.e., clockwise when viewed from behind the drive screw, which causes contact member 160 to apply force 174 against guide bar 146, such that contact member 160 and bar 146 both translate in the direction of the force vector 174 (towards mounting plate 58). By this action, it may be seen that the contact member 160 and guide bar 146 have both moved away from their starting position shown in FIG. 9, causing the entire engagement member 134 and roll 28 to similarly move, i.e., in the direction of arrow 178, towards mounting plate 58/support member 12. If conditions necessitate the roll 28 to be moved away from support member 12 (described below), motor 156 will cause drive screw 158 to rotate in the opposite direction as that of rotational arrow 176, and thus cause contact member 160 to translate in the opposing direction to that of force vector 174 (i.e., away from mounting plate 58). The force 142 exerted by biasing element 136 on guide bar 146 against contact member 160 will cause the guide bar, and thus the entire engagement member 134 and roll 28, to remain in contact with, and thus follow, the contact member away from mounting plate 58, i.e., in the opposite direction of arrow 178.

In view of the foregoing, it may now be appreciated that the engagement member 134, biasing element 136, and actuator 138 synergistically cooperate to control both the loading and precision-placement of web roll 28 on spool 18. The former serves to protect motor 156 during roll loading, which maintains the latter ability of the positioning mechanism 132 to accurately control the position of web roll 28, and thereby properly align web 26 as it is conveyed through machine 10.

Machine 10 may include a web tracking sensor 180, which is adapted to detect a transverse position of the inflatable web 26 with respect to inflation device 22 (FIG. 6). Information from the web tracking sensor 180 may be used to control the operation of the positioning mechanism 132 in order to establish a desired position of roll 28 on spool 18, to thereby maintain the transverse position of web 26 within a predetermined range for optimum alignment with inflation system 22 and sealing device 24.

In some embodiments, the web tracking sensor 180 may be structured and arranged to detect the transverse position of the web 26 by detecting the position of the open longitudinal edge 30a and/or the position of printed marks on the web, e.g., via a mechanical contact sensor, an optical sensor, an ultrasonic sensor, etc.

Alternatively or in addition, the tracking sensor 180 may be structured and arranged to detect the transverse seals 38, e.g., ends 42a or 42b thereof, such that a position of the transverse seals and/or the ends thereof indicates the transverse position of the web 26. For example, in the embodiment illustrated in FIGS. 10-11, the tracking sensor 180 is structured and arranged to detect first ends 42a of the transverse seals 38 via physical contact, such that the position of such first ends 42a indicates the transverse position of the inflatable web 26. Alternatively, the transverse seal ends 42a could be detected optically, i.e., via an optical sensor adapted to optically detect such seal ends.

Controller 94 may be in operative communication with both web tracking sensor 180, e.g., via input cable 182 (FIG. 10), and with positioning mechanism 132, e.g., via output cable 184 (FIGS. 5, 8 and 11). Controller 94 may further be adapted, e.g., programmed, to receive input 182 from tracking sensor 180 and, based on that input, send output 184 to positioning mechanism 132 to adjust the position of roll 28 on spool 18 so as to maintain the transverse position of the inflatable web 26 within a predetermined range, e.g., so that the first ends 42a of transverse seals 38 are neither too close nor too far away from tracking sensor 180, and thus in good alignment with inflation system 22 and sealing device 24 for proper inflation and sealing.

Figure 10:
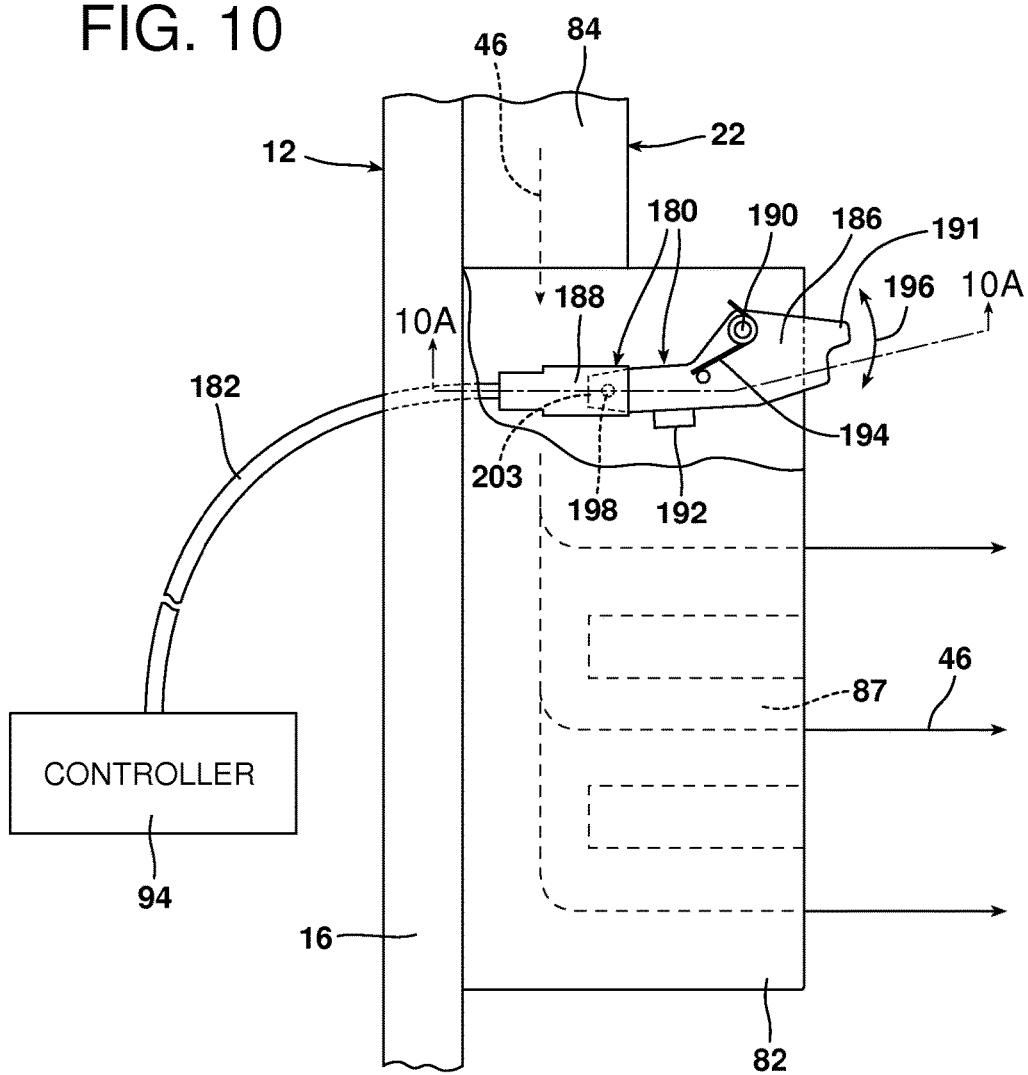
FIG. 10 is a plan view of the inflation system, web tracking sensor, and controller components of the machine as shown in FIG. 1.

In the illustrated embodiment, tracking sensor 180 may be structured and arranged to be contacted by the first ends 42a of transverse seals 38. Tracking sensor 180 may thus comprise a contact sensor 186 and a detection sensor 188. Contact sensor 186 may be adapted to make physical contact with transverse seals 38 without impeding the movement of the web 26 along path 40. The contact sensor 186 may thus be movable, e.g., pivotable, translatable, bendable, etc., so that it moves upon contact with the transverse seals 38. In the illustrated embodiment, contact sensor 186 is pivotally mounted inside of inflation nozzle 82 at pivot point 190, with a contact portion 191 extending from nozzle 82 so as to make contact with transverse seals 38 in sequential fashion as web 26 is conveyed past the inflation nozzle. Contact portion 191 thus resides inside of web 26 during inflation and sealing operations, i.e., between sheets 36a, b at the openings 34 of the containers 32. Contact sensor 186 may be biased against pivot stop 192 by coil spring 194, and is thus pivotally movable along arcuate arrow 196 (FIG. 10).

Figure 10A:
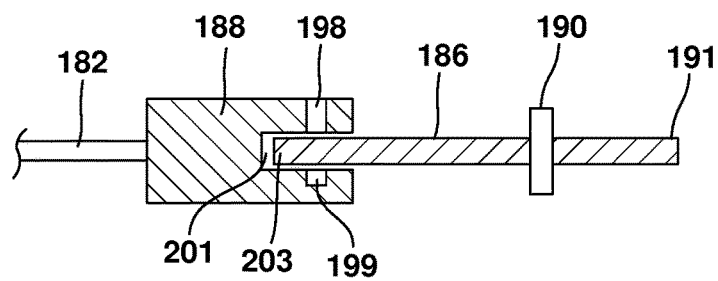
FIG. 10A is a cross-sectional view taken along lines 10A-10A in FIG. 10.

The movement of contact sensor 186 serves two functions. First, by moving upon contact with the seals 38, the contact sensor 186 allows the web 26 to continue its conveyance along path 40 (FIG. 11). Preferably the movement is such that web conveyance continues without significant deviation due to the contact with the sensor. Secondly, the movement of the contact sensor 186 allows detection thereof by the detection sensor 188 in such a way that the transverse position of web 26 may be determined. The detection sensor 188 may, for example, be an optical sensor, including a light emitter 198 and a light receptor 199 (FIG. 10A), wherein light emitter 198 produces a beam of light, which is detect by light receptor 199, with emitter 198 and receptor 199 being spaced apart by gap 201. The contact sensor 186 and detection sensor 188 may be relatively arranged as shown in FIG. 10A, such that a tail portion 203 of contact sensor 186 is pivotally movable through gap 201 in detection sensor 188 as contact sensor 186 pivots about pivot point 190 through arc 196. Further, when the contact sensor 186 is in a neutral or resting position as shown in FIG. 10, i.e., with spring 194 urging the sensor against pivot stop 192 due to no contact between contact portion 191 and transverse seals 38, the tail portion 203 is positioned inside of detection sensor 188 such that the tail portion is interposed between light emitter 198 and light receptor 199, whereby the tail portion 203 prevents the light beam produced by emitter 198 from reaching receptor 199. In this position, the tail portion 203 may be said to 'break' such light beam, such that no light is detected by receptor 199. The detection sensor 188 may thus be configured to send signal 182 to controller 94 only when, and for so long as, light is detected by receptor 199, whereby such signal 182 is indicative of both the fact and duration of contact between transverse seals 38 and contact portion 191 of contact sensor 186.

In the illustrated embodiment, the incidence and duration of light detection by receptor 199, i.e., based on the movement of contact sensor 186 due to contact with transverse seals 38, provides an indication of the transverse position of web 26. Thus, for example, if no light is detected, this means that the ends 42a of transverse seals 38 are not making contact with contact sensor 186 because the ends 42a, and therefore web 26, are too far away from inflation system 22 and sealing device 24 for proper inflation and sealing of the web 26. In this case, controller 94 sends a command output 184 to positioning mechanism 132, to move the roll 26 on spool 18 in the direction of arrow 178, i.e., towards mounting plate 58/support member 12 (FIG. 9C), which causes web 26, and thus ends 42a of transverse seals 38, to move closer to inflation system 22 and sealing device 24.

In contrast, if periodic contact is made between the contact sensor 186 and ends 42a of the transverse seals, but the corresponding periodic duration of light detection by receptor 199 is above a predetermined value, this is an indication that the web 26 (transverse seals 38 thereof) are too close to inflation system 22 and sealing device 24. In such condition, the ends 42a of the transverse seals hold the contact sensor 186 pivotally away from its neutral/beam-breaking position (FIG. 10) for a duration of time that is greater than when the ends 42a are farther away from the sensor. The proper duration of light detection for correct positioning of the ends 42a, representing optimal alignment of web 26 for inflation and sealing, can be readily determined, e.g., empirically, by those having ordinary skill in the art of making and/or using inflation and sealing machines without undue experimentation. Once this value is determined, it can be programmed into controller 94. Thus, when a light detection duration occurs that exceeds the predetermined/pre-programmed value, controller 94 will send a command output 184 to positioning mechanism 132 to move the roll 26 in the opposite direction of arrow 178 (FIG. 9C), i.e., away from mounting plate 58/support member 12. This causes web 26, and thus ends 42a of transverse seals 38, to move away from contact sensor 186, inflation system 22, and sealing device 24.

As a further example, light may be detected by receptor 199 in intervals, indicating periodic contact between transverse seals 38 and contact sensor 186, but the duration of each period of light detection may be below the predetermined/pre-programmed value as described above. In this case, the web 26 is not so far away from inflation system 22 that the transverse seal ends 42a fail to make contact with contact sensor 186, but the web is still too far away for optimal alignment as indicated by the contact sensor 186 being held pivotally away from its neutral/beam-breaking position (FIG. 10) for a duration of time that is less than desired for a proper spatial relationship between the contact sensor 186 and the transverse seal ends 42*a*. In this case, like the 'no-contact' scenario described above, controller 94 sends a command output 184 to positioning mechanism 132, to move the roll 26 on spool 18 in the direction of arrow 178 (FIG. 9C), which causes web 26 to move closer to inflation system 22 and sealing device 24.

In a typical case, the transverse position of inflatable web 26 will oscillate within a range, centered on the predetermined/pre-programmed value for the periodic duration of light detection by receptor 199, which corresponds to the selected spatial relationship between the contact sensor 186 and the transverse seal ends 42*a*. Such predetermined range may be as narrow or wide as desired, e.g., depending on how controller 94 is programmed to run the resultant feed-back control loop. In this regard, various modes of control may be employed by controller 94, including proportional, derivative, integral, and combinations thereof, e.g., PID (proportional-integral-derivative) control, to achieve a desired predetermined range within which the transverse position of web 26 oscillates.

Controller 94 may be in the form of a printed circuit assembly, e.g., a printed circuit board (PCB), and include a control unit, e.g., an electronic controller, such as a microcontroller, which stores pre-programmed operating codes; a programmable logic controller (PLC); a programmable automation controller (PAC); a personal computer (PC); or other such control device which is capable of receiving both operator commands and electronic, sensor-generated inputs, and carrying out predetermined, e.g., pre-programmed, operations based on such commands and inputs. Programming commands may be supplied to the controller 94 via control panel 90 or other type of operator interface, e.g., a wireless communication device.

Controller 94 may further be adapted, e.g., programmed, to determine the length of the containers 32 in any given inflatable web used with machine 10. With respect to the illustrated web 26, for example, the "length" is the longitudinal distance between a leading transverse seal 38*a* from a downstream pair of seals 38 and a following transverse seal 38*b* from an adjacent, upstream pair of seals 38, i.e., as measured parallel to the longitudinal edges 30*a, b*. The container length may be determined by controller 94 based on the rate at which web 26 is conveyed along path 40 by conveyance system 20, and upon the duration of the beam-break periods in web tracking sensor 180, in which the contact sensor 186 moves between transverse seals 38*a, b* within a container 32, and is thus in its neutral/non-contact position as shown in FIG. 10. The rate of web conveyance is a value that is stored in, i.e., 'known by', controller 94, e.g., based on operator input via control panel 90 (and thus the basis of output 102 from controller 94 to conveyance system 20).

The ability to determine container-length is advantageous, in that it allows the operations of selected sub-assemblies of machine 10 to be customized, based on the determined container-length in the web that is in use as the determination is made, in order to optimize the inflation and sealing of the containers in such web. For example, smaller containers often benefit from higher inflation rates vs. larger containers, and thus the speed of blower 80 may be varied based on the detected container-length.

Figure 12:
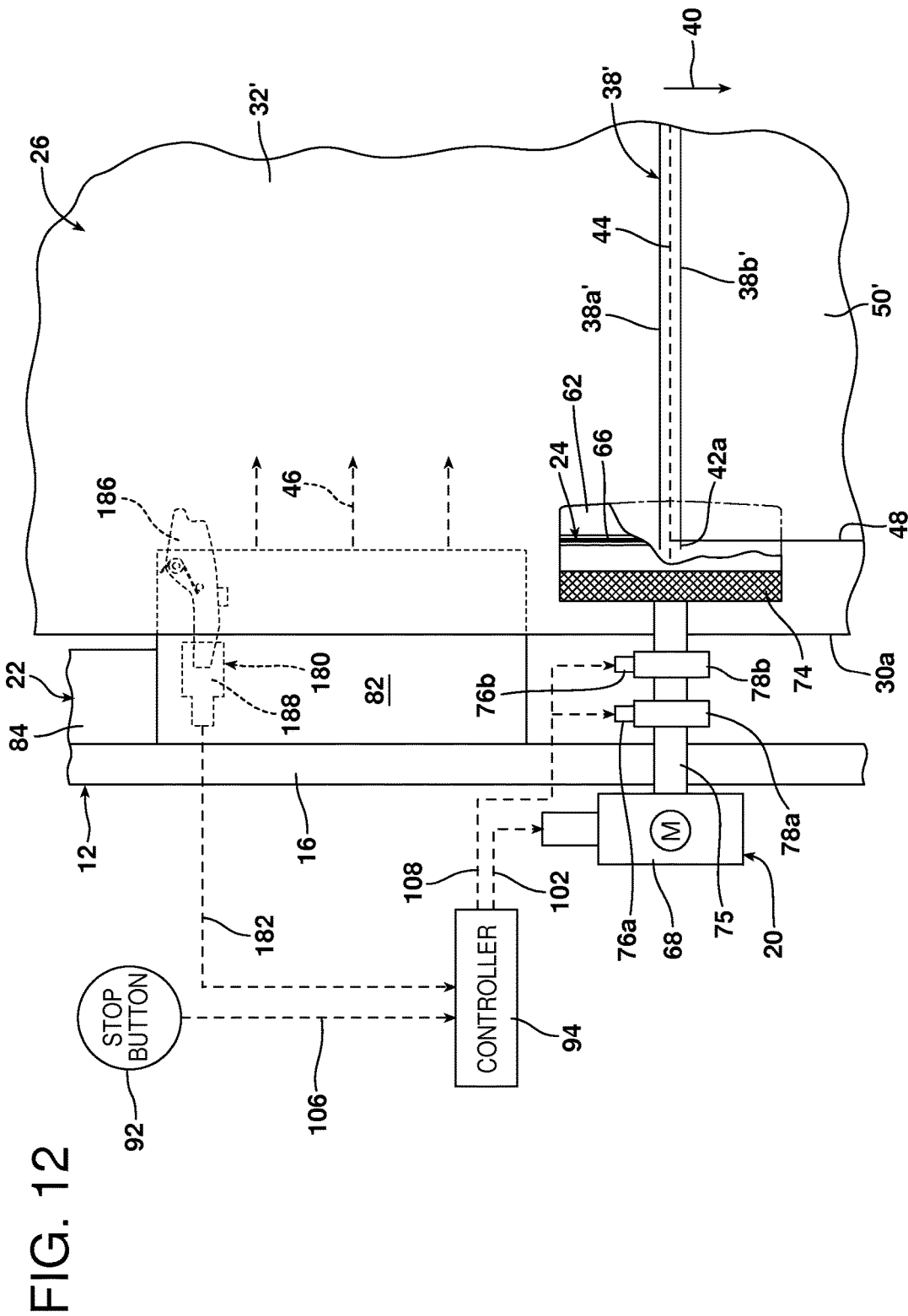
FIG. 12 is a plan view similar to FIG. 11, showing the advancement of the web to a stopping point.

A related feature will be described with respect to FIG. 12, wherein controller 94 may further be adapted, e.g., programmed, to cause machine 10 to discontinue operations in such a manner that inconsistent inflation of containers 32 is avoided or at least minimized as a result of a 'stop-then-restart' event. In accordance with this embodiment of the invention, controller 94 may thus be configured and programmed to receive a stop command, e.g., from an operator via stop button 92 on control panel 90, and, based on input 182 from tracking sensor 180, send output 102 to web conveyance system 20 to stop conveying the inflatable web 26 such that the web stops at a predetermined location relative to a pair of the transverse seals 38 from adjacent containers, e.g., an un-inflated container 32 adjacent to an inflated container 50.

Using the depiction in FIG. 12 for illustration purposes, one example of a predetermined location at which conveyance system 20 may stop the conveyance of web 26 will be described. Such "predetermined location" may be one in which a pair of transverse seals 38, designated as 38' for illustration purposes, from adjacent containers, e.g., an un-inflated container 32' and an inflated container 50', arrive at and stop in a straddling position relative to sealing device 24. In this manner, the downstream container 50' associated with the downstream one 38*b*' of the pair of transverse seals 38' is fully inflated and sealed closed, with longitudinal seal 48 intersecting the transverse seal 38*b*' to seal closed the downstream/inflated container 50'. On the other hand, the upstream container 32' associated with the upstream one 38*a*' of the pair of transverse seals 38' is in position to be fully inflated by inflation system 22 and sealed closed by sealing device 24 upon receipt of a restart command, e.g., by the machine operator via start button 91 on control panel 90.

In FIG. 11, transverse seal pair 38' is making contact with contact sensor 186, and this event is being 'reported' to controller 94 via input signal 182 from detection sensor 188. The controller 94 thus 'knows' the location of the transverse seal pair 38', as well as its rate of conveyance between tracking sensor 180 and sealing device 24. Upon receipt of a stop command from stop button 92 (input signal 106 from control panel 90—see FIG. 12), the controller 94 controls, e.g., slows, the rate of conveyance of web 26 via output signal 102/motor 68 such that the web stops just as transverse seal pair 38' has arrived at the straddling position shown in FIG. 12.

This feature advantageously ensures that the downstream container 50' is fully inflated and sealed closed, and that the upstream container 32' is in the correct position to be fully inflated and sealed closed upon a re-start of the machine, so that inconsistent inflation (e.g., under-inflation, over-inflation, or non-inflation) of the containers does not result from stop/re-start episodes.

With reference now to FIG. 13, a further feature of the invention will be described. Due to the dynamic nature of conveying web 26 and inflating containers 32 therein on a continuous basis, irregularities frequently develop in the web, including wrinkling in one or both of the juxtaposed sheets 36*a* or 36*b* and relative movement therebetween in the vertical, lateral, and/or longitudinal (path 40) dimension. The inventors found that irregularities of this type lead to inconsistent formation of longitudinal seal 48, which results in the inability of inflated containers 50 to maintain gas pressure, i.e., the containers leak and go flat, making them wholly ineffective as cushions. The inventors discovered a solution to this problem, whereby sealing device 24 may include a seal zone 200 and an isolation zone 202. Isolation zone 202 is upstream from seal zone 200 along the path of travel 40. Advantageously, the isolation zone 202 is structured and arranged to substantially isolate the seal zone 200 from irregularities in the web 26 as it is conveyed along path 40, thereby improving the consistency and quality of the longitudinal seal 48 produced by sealing device 24.

As described above, sealing device 24 may comprise a pair of convergent members, e.g., a pair of counter-rotating rollers 62, 64, with sealing element 66 secured to at least one of the rollers, e.g., to roller 62 as shown. Alternatively, one convergent member may be rotary while one is stationary. In the illustrated embodiment, the seal zone 200 is located at a point of convergence between the convergent rollers 62, 64, i.e., with nip 65 being located within seal zone 200, while the isolation zone 202 comprises a segment 204 of one of the convergent members, e.g., backing roller 64, against which web 26 is directed (FIG. 13). Sealing device 24 may further comprise a deflection device 206, which is structured and arranged to intersect with path 40 in such a way that web 26 is deflected and directed against segment 204 as the web is conveyed along path 40, to thereby produce isolation zone 202.

By directing the web 26 against segment 204, the deflection device 206 tensions the web against such segment in the resultant isolation zone 202, which has the effect of dampening relative movement of sheets 36a, b, smoothing out wrinkles in web 26, and otherwise isolating such irregularities from the downstream seal zone 200. This has been found to greatly improve both the quality and consistency of longitudinal seal 48. In the illustrated embodiment, isolation zone 202 is angularly displaced from seal zone 200, and comprises a fixed segment 204, i.e., a fixed arc, of backing roller 64, through which the roller rotates as it comes into contact with web 26, due to the deflection thereof by deflection device 206. Roller 64 maintains contact with web 26 through seal zone 200, and then leaves contact with the web after rotating through the seal zone. The deflection device 206 may comprise a guide bar as shown, or any suitable device capable of deflecting the web onto backing roller 64, such that isolation zone extends from the deflection device 206 to seal zone 200.

Referring now to FIGS. 14-15, a further aspect of the invention will be described. The inventors have determined that another problem associated with rotary sealing devices is web-wrap around one of the rollers. That is, the web will periodically remain adhered to one of the rollers, resulting in the entire web being caught up, i.e., wound up, in the roller, necessitating a machine shut-down to untangle the web from the roller. The inventors have found a solution to this problem, whereby sealing device 24 may further include one or more web guides 208 (FIG. 14) or 208' (FIG. 15). Advantageously, the web guides 208, 208' are structured and arranged to direct at least a portion of the web 26 away from seal zone 200 as the web is conveyed along path 40, in order to prevent the web from becoming entangled in the rollers 62, 64 as a result of the formation of longitudinal seal 48 by sealing device 24.

One embodiment is illustrated in FIG. 14, wherein web guides 208, e.g., a pair of such web guides 208a, b, one for sealing roller 62 and one for backing roller 64, respectively, direct web 26 away from seal zone 200 in a downstream direction along path 40. In this regard, it may be seen that at least a portion 210a, b of each respective web guide 208a, b is downstream from seal zone 200 along path 40, so that the web 26 is directed in a substantially linear path, e.g., a tangential, non-rotary path, which does not follow the rotation of either of the rollers 62, 64 away from seal zone 200. Alternatively or in addition, one or both of the web guides 208a, b, e.g., web guide 208a, may include a lateral segment 211 to direct web 26 away from seal zone 200 in a lateral direction, i.e., laterally away from sealing roller 62. As illustrated, lateral segment 211 extends from web guide 208a in a lateral direction relative to path 40. Although a pair of web guides 208a, b is illustrated, only one of the web guides, i.e., either 208a or 208b, may be employed if desired.

An alternative embodiment is shown in FIG. 15, wherein web guides 208', e.g., a pair of such web guides 208a' and 208b', one on each opposing side of sealing roller 62, direct web 26 away from seal zone 200 in a radial direction, i.e., radially away from sealing roller 62. In this regard, it may be seen that at least a portion 210a' and 210b' of each respective web guide 208a' and 208b' is radially spaced from seal zone 200 relative to sealing roller 62, such that web 26 is directed radially away from the seal zone 200, e.g., with downward angles relative to path 40. Although a pair of web guides 208a' and 208b' is illustrated, only one of the web guides, i.e., either 208a' or 208b', may be employed if desired. Further, the web guides 208 and 208' may be used together, i.e., in combination, or independently (as illustrated).

With reference back to FIG. 5, an additional feature of the invention will be described. FIG. 5 illustrates one mode of operation, wherein machine 10 may include surface supports, i.e., 'feet', 212, which are adapted to allow the machine to be mounted on a table 214 during operations. A receptacle 216 may be placed adjacent to table 214 as shown, such that completed containers 50 may be directed from machine 10 and into the receptacle, e.g., in order to generate a readily-available supply of the inflated/sealed containers for subsequent use. Machine 10 may thus further include a detector 218 adapted to detect the presence of a predetermined quantity of the inflated containers 50 in receptacle 216, e.g., a height of the inflated containers in the receptacle. Detector 218 may be in operative communication with controller 94, e.g., via input cable 220, and the controller may be adapted, e.g., programmed, to perform at least one of:

a) stopping operation of machine 10 once the predetermined quantity is detected; and b) starting operation of the machine if such predetermined quantity is not detected.

In this manner, a predetermined quantity of inflated containers 50 may be maintained in the receptacle 216. Detector 218 may be an ultrasonic sensor or the like.

Figure 16A:
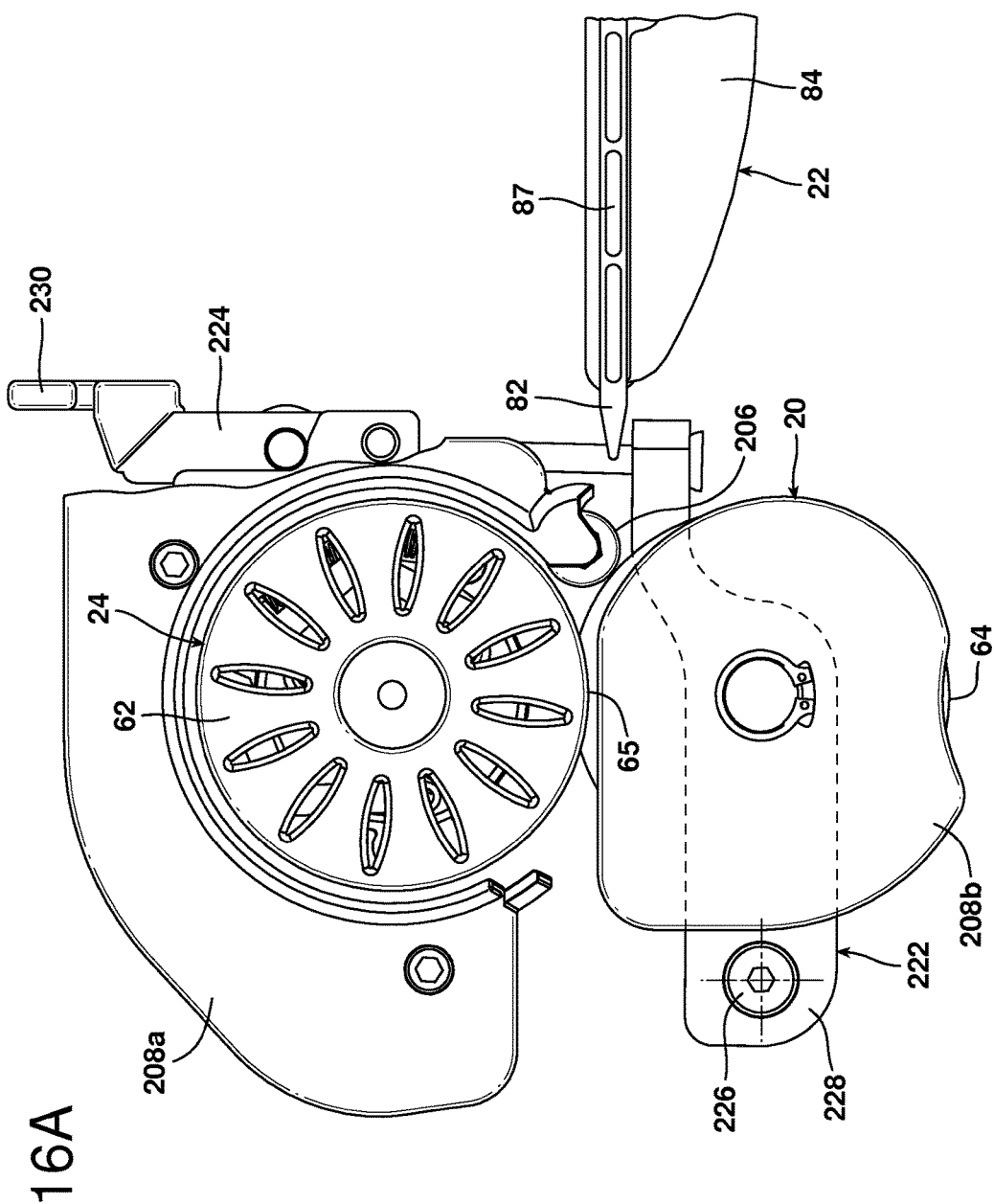
FIGS. 16A-16B are similar to FIG. 14, illustrating two different positions of a pivot mechanism.
Figure 16B:
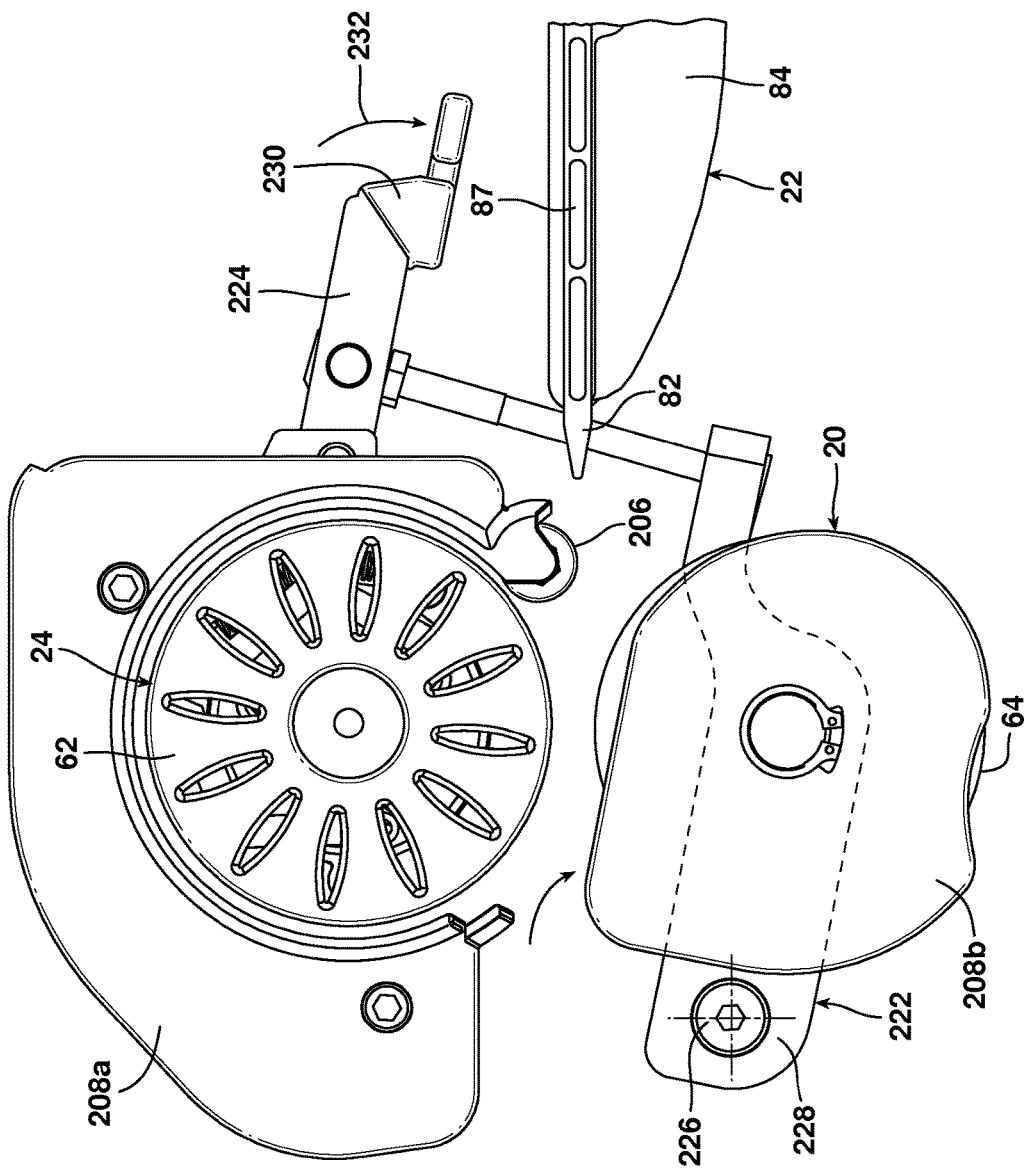

Finally, with reference to FIGS. 16A-16B, a further feature of the invention will be described. Web conveyance system 20 may comprise a pair of rotary members, e.g., rollers 62, 64, wherein at least one of the rotary members is mounted on a pivot mechanism 222 with an upstream actuator 224 and a downstream pivot point 226. The pivot mechanism 222 is movable between:

(1) a conveyance position (FIG. 16A), at which the rotary members/rollers 62, 64 are in contact with one another at nip 65, i.e., the point of convergence between the two rollers, and (2) a web-threading position (FIG. 168), at which the rotary members/rollers 62, 64 are not in contact with one another.

In the illustrated embodiment, backing roller 64 is carried on pivot frame 228, which is pivotally mounted on support structure 12 at pivot point 226. Pivot mechanism 222 is a four-bar link mechanism, and includes a pivotally-movable handle member 230. When grasped and moved in the direction of arrow 232 (FIG. 16B), the handle member 230 of pivot mechanism 222 allows the backing roller 64 to be moved out of contact with sealing roller 62 to facilitate the placement of web 26 between such rollers, e.g., upon placement of a new roll 28 on spool 18 and subsequent 'threading' of the new web 26 through the above-described components of machine 10 along path 40. Once the threading is complete, the handle member 230 is moved in the opposing direction of arrow 232 in order to return the pivot mechanism 222 to its conveyance position as shown in FIG. 16A, so that the rollers 62, 64 are in compressive contact with opposing sides of web 26 and ready to begin withdrawing the web from the new roll and advancing the web along path 40.

The above-described arrangement, i.e., wherein the pivot point 226 is downstream and the actuator 224 is upstream, is beneficial because it has been found to be ergonomically easier to thread a new web 26 into machine 10 with such arrangement, e.g., in comparison with the inverse arrangement.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. A machine for inflating and sealing an inflatable web comprising opposing longitudinal edges and a pair of sheets sealed together by transverse seals that form a series of inflatable containers between pairs of the transverse seals, each of the containers being capable of holding therein a quantity of gas and having an opening for receiving such gas, said machine comprising:
   a. a support structure;
   b. a spool attached to said support structure for rotatively supporting a roll of the inflatable web, said spool having a proximal end at which said spool is attached to said support structure;
   c. a positioning mechanism structured and arranged to establish a position of the roll on said spool, said positioning mechanism comprising
      1) an engagement member interposed between the roll and said support structure at said proximal end of said spool, said engagement member adapted to engage the roll and move relative to said spool, and
      2) an actuator structured and arranged to move said engagement member to thereby establish said position of the roll on said spool, wherein said actuator and said engagement member are configured to separate from one another when a force exerted by the roll on said engagement member, as the roll is loaded onto the spool, exceeds a predetermined amount;
   d. a web conveyance system for conveying the inflatable web along a path of travel substantially parallel to the longitudinal edges of the inflatable web;
   e. an inflation system structured and arranged to direct gas into the openings of the containers as the web is advanced along the path, thereby inflating the containers;
   f. a web tracking sensor adapted to detect a transverse position of the inflatable web with respect to said inflation system;
   g. a sealing device for sealing closed the openings of the containers after inflation thereof by the inflation system; and
   h. a controller in operative communication with said web tracking sensor and with said positioning mechanism, said controller adapted to receive input from said tracking sensor and, based on said input, send output to said positioning mechanism to adjust said position of the roll on said spool so as to maintain said transverse position of the inflatable web within a predetermined range.

2. The machine of claim 1, wherein said actuator and said engagement member have respective opposing surfaces that are shaped and relatively positioned to
   a) engage one another when said actuator moves said engagement member, and
   b) disengage from one another when said force exceeds said predetermined amount.

3. The machine of claim 2, wherein
   a) said actuator comprises a contact member having one of said opposing surfaces;
   b) said engagement member comprises a contact ring and a guide bar, said guide bar having the other of said opposing surfaces;
   c) said contact ring is attached to said guide bar; and
   d) said guide bar is structured and arranged to be linearly movable within a track.

4. The machine of claim 3, wherein said positioning mechanism further includes a biasing element for biasing said engagement member towards said actuator such that, when a roll is loaded onto said spool with a force on said engagement member that exceeds said predetermined amount to cause said actuator and said engagement member to separate from one another, said biasing element controls movement of the roll during said separation.

5. The machine of claim 4, wherein
   said biasing element urges said guide bar into engagement with said contact member with a biasing force; and
   said predetermined amount of force above which said actuator and said engagement member separate from one another comprises said biasing force.

6. The machine of claim 5, wherein said actuator is adapted to exert a force against said guide bar, which opposes said biasing force.

7. The machine of claim 1, wherein said tracking sensor is structured and arranged to detect ends of the transverse seals such that a position thereof indicates said transverse position of the inflatable web.

8. The machine of claim 1, wherein said controller is further adapted to
   a) receive a stop command; and
   b) based on said input from said tracking sensor, send output to said web conveyance system to stop conveying the inflatable web such that the web stops at a predetermined location relative to a pair of the transverse seals from adjacent containers.

9. The machine of claim 1, wherein
   a) said sealing device includes a seal zone and an isolation zone;
   b) said isolation zone is upstream from said seal zone along said path of travel; and
   c) said isolation zone is structured and arranged to substantially isolate said seal zone from irregularities in the web as it is conveyed along said path.

10. The machine of claim 9, wherein
    a) said sealing device comprises a pair of convergent members;
    b) said seal zone is located at a point of convergence between said convergent members; and
    c) said isolation zone comprises a segment of one of said convergent members against which said web is directed.

11. The machine of claim 10, wherein said sealing device further comprises a deflection device, which is structured and arranged to intersect with said path in such a way that the web is directed against said segment as the web is conveyed along said path, to thereby produce said isolation zone.

12. The machine of claim 1, wherein
a) said sealing device includes a seal zone and one or more web guides; and
b) said web guides are structured and arranged to direct at least a portion of the web away from said seal zone as the web is conveyed along said path.

13. The machine of claim 1, wherein
a) the roll includes a core having an inner diameter; and
b) said spool includes a contact surface and is structured and arranged such that said contact surface exerts an outwardly-biased force against the inner diameter of the core.

14. The machine of claim 1, further including a detector adapted to detect the presence of a predetermined quantity of inflated containers in a receptacle, said detector being in operative communication with said controller and said controller being adapted to perform at least one of:
a) stopping operation of said machine once said predetermined quantity is detected; and
b) starting operation of said machine if said predetermined quantity is not detected.

* * * * *